(12) United States Patent
Reiss et al.

(10) Patent No.: US 8,158,180 B2
(45) Date of Patent: Apr. 17, 2012

(54) PROCESS FOR THE PREPARATION OF A FLAVORING CONCENTRATE

(75) Inventors: Ingo Reiss, Holzminden (DE); Harry Erfurt, Uslar (DE); Frank Ott, Holzminden (DE); Günter Kindel, Höxter (DE); Bernd Gabriel, Negenborn (DE)

(73) Assignee: Symrise GmbH & Co. KG, Holzminden (DE)

( * ) Notice: Subject to any disclaimer, the term of this patent is extended or adjusted under 35 U.S.C. 154(b) by 689 days.

(21) Appl. No.: 12/335,859

(22) Filed: Dec. 16, 2008

(65) Prior Publication Data

US 2009/0155446 A1    Jun. 18, 2009

Related U.S. Application Data

(60) Provisional application No. 61/014,146, filed on Dec. 17, 2007.

(51) Int. Cl.
*A23L 1/22* (2006.01)

(52) U.S. Cl. ......... 426/534; 426/490; 426/535; 426/650

(58) Field of Classification Search .......... 426/490, 426/534, 535, 536, 538, 650
See application file for complete search history.

(56) References Cited

FOREIGN PATENT DOCUMENTS

| DE | 198 35 542 A1 | 2/2000 |
|---|---|---|
| EP | 0 082 284 A | 6/1983 |
| EP | 0 198 262 A | 10/1986 |
| EP | 1 205 544 A | 5/2002 |
| WO | WO-02/36720 A | 5/2002 |

OTHER PUBLICATIONS

Database WPI Week 199405, Thomson Scientific, London, GB; AN 1994-040123, XP002513759 & JP 05 345899 A (Jumoku Chushutsu Seibun Riyo) Dec. 27, 1993 * Zusammenfassung *.

*Primary Examiner* — Leslie Wong
(74) *Attorney, Agent, or Firm* — Connolly Bove Lodge & Hutz LLP

(57) ABSTRACT

The present invention relates to processes for the preparation of a flavoring concentrate, to a flavoring concentrate which can be prepared by a process according to the invention, to products comprising one or more flavoring concentrates according to the invention, and to processes for the concentration of flavoring and/or aromatic substances.

17 Claims, No Drawings

PROCESS FOR THE PREPARATION OF A FLAVORING CONCENTRATE

CROSS-REFERENCE TO RELATED APPLICATION

This application claims benefit of priority to U.S. Provisional Application No. 61/014,146, filed on Dec. 17, 2007, which is incorporated herein by reference in its entirety.

The present invention relates to a process for the preparation of a flavoring concentrate, to a flavoring concentrate which can be prepared by a process according to the invention, to products comprising one or more flavoring concentrates according to the invention, and also to processes for concentrating flavoring and/or aromatic substances.

The ever increasing demand for products in the food and drink sector also increases the demand for ever new flavorings and flavoring profiles.

A flavoring is often imparted by a plurality of flavoring and/or aromatic substances, it being the case that flavoring and/or aromatic substances which convey a positive sensory impression as well as flavoring and/or aromatic substances which convey a negative sensory impression both influence the sensory impression.

DE 19835542 A1 describes a process for concentrating, separating and purifying binary aromatic substance mixtures in individual compounds. In this process, one of the two corresponding substances of this binary substance mixture is produced from the respective other substance and both substances are separated from one another by means of zeolites. The splitting of a more complex mixture is not described.

An objective of the present invention is to provide a process by which it is possible to produce from an aqueous flavoring a flavoring concentrate which comprises one or more flavoring and/or aromatic substances which convey a positive sensory impression and one or more flavoring and/or aromatic substances which convey a negative sensory impression, and in the resulting flavoring concentrate, compared to the flavoring and/or aromatic substance or substances which convey a negative sensory impression, the flavoring and/or aromatic substance or substances which convey a positive sensory impression are present in a proportionally higher concentration than in the aqueous flavoring.

Accordingly, the present problem is solved by the subject-matters of the independent claims. Preferred embodiments are provided in particular in the dependent claims and in the following description.

Thus, the present problem is solved by a process for the preparation of a flavoring concentrate in that one or more flavoring and/or aromatic substances which convey a positive sensory impression independently of one another are more highly concentrated, in each case by a factor of 1.5 or more, than one or more flavoring and/or aromatic substances which convey a negative sensory impression, based on an aqueous flavoring, comprising or consisting of the following steps:

a) preparation of an aqueous flavoring comprising
  i. one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z, 7Z-tridecatrienal, 2E,5Z-undecadienal, nonanal, 4-ocanolide, 5-octanolide, phenylethanol, wine lactone and menthofurolactones,
  ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid, b) preparation of one, two or more solvents suitable for foodstuffs, c) addition of the solvent(s) of step b) to the solution of step a), the resulting solvent proportion being adjusted such that the one or more flavoring and/or aromatic substances from group i) independently of one another have in each case a log Pow* value of greater than or equal to 1.20, and the log Pow* value is calculated as follows:

$$\log \text{Pow*} = \log \text{Pow} - x \cdot P'(x)/\log \text{Pow}$$

where log Pow is the decimal logarithm of the distribution coefficient of the flavoring and/or aromatic substance between 1-octanol to water,
  where x is the resulting solvent proportion based on the total volume proportion, normalized as 1.0, and
  where $P'(x)$ is the polarity parameter for the corresponding solvent in the resulting solvent proportion x, d) preparation of an adsorption material in a suitable apparatus, e) passing the solution of step c) through an apparatus with adsorption material of step d) so that predominantly the one or more flavoring and/or aromatic substances which convey a positive sensory impression are adsorbed on the absorption material, f) preparation of one, two or more solvents suitable for foodstuffs, g) desorption of the flavoring and/or aromatic substances from the adsorption material of step e) with the solvent(s) of step f), such that in the resulting flavoring concentrate the one or more flavoring and/or aromatic substances from group i), compared to the one or more flavoring and/or aromatic substances from group ii), are present in a higher concentration, independently of one another, in each case by a factor of 1.5 or more than in the aqueous flavoring of step a).

A corresponding process is also termed an "adsorption process" within the context of this invention.

A further object of the present invention relates in particular to a process for the preparation of a flavoring concentrate, in which process one or more flavoring and/or aromatic substances which convey a positive sensory impression independently of one another are more highly concentrated, in each case by a factor of 1.5 or more, than one or more flavoring and/or aromatic substances which convey a negative sensory impression, based on an aqueous flavoring, comprising or consisting of the following steps:

a) preparation of an aqueous flavoring comprising
  i) one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones, ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid, the proportion of solvent, based on the total volume of the aqueous solution, being present within a range of from 0% by volume to less than 1% by volume, b) preparation of an adsorption material in a suitable apparatus, c) passing the solution of step a) through an apparatus with adsorption material of step b) so that the one or more flavoring and/or aromatic substances from group i) are completely adsorbed on the absorption material and the one or more flavoring and/or aromatic substances from group ii) are for the most part adsorbed on the absorption material, d) preparation of one or more solvents or solvent mixtures with water, the solvents or solvent mixtures being selected such that one or more flavoring and/or aromatic substances from group ii) have a log Pow* value of 1.20 or less, and e) desorption of the flavoring and/or aromatic substances from the adsorption material of step c) with the solvents or the solvent mixtures of step d), one, two, three, four, five, six, seven or more fractions being collected over time and one of these fractions or a mixture of two, three, four, five, six, seven or more of these fractions forming the flavoring concentrate, and in the resulting flavoring concentrate the one or more flavoring and/or aromatic substances from group i), compared to the one or more flavoring and/or aromatic substances from group ii), are present in a higher concentration, independently of one another, in each case by a factor of 1.5 or more than in the aqueous flavoring of step a), the solvent or solvents used for desorption being selected such that the flavoring and/or aromatic substances to be desorbed have a log Pow* value of 1.20 or less and the log Pow* value is calculated as follows:

log Pow*=log Pow−$x$*P'($x$)/log Pow where log Pow is the decimal logarithm of the distribution coefficient of the flavoring and/or aromatic substance between 1-octanol to water, where $x$ is the resulting solvent proportion based on the total volume proportion, normalized as 1.0, and where P'($x$) is the polarity parameter for the corresponding solvent in the resulting solvent proportion $x$.

A corresponding process is also termed a "desorption process" within the context of this invention.

The present invention further relates to a flavoring concentrate which can be prepared or is prepared by one of the above preparation processes according to the invention.

Furthermore, the present invention also relates to foodstuff, enjoyment food, beverage, semi-finished, oral hygiene, cosmetic or pharmaceutical products comprising one or more flavoring concentrates according to the invention as well as one or more basic substances, auxiliaries and/or additives.

Furthermore, the present invention also relates to the use of flavoring concentrates according to the invention in foodstuff, enjoyment food, beverage, semi-finished, oral hygiene, cosmetic or pharmaceutical products.

A further object of the present invention relates to the use of flavoring concentrates according to the invention for the production of foodstuff, enjoyment food, beverage, semi-finished, oral hygiene, cosmetic or pharmaceutical products.

The present invention also relates to a process for the concentration of one or more flavoring and/or aromatic substances, which convey a positive sensory impression, in a resulting flavoring concentrate independently of one another, in each case by a factor of 1.5 or more, compared to one or more flavoring and/or aromatic substances which convey a negative sensory impression, based on an aqueous flavoring, comprising or consisting of the following steps:

a) preparation of an aqueous flavoring comprising
   i. one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones,
   ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid, b) preparation of one, two or more solvents suitable for foodstuffs, c) addition of the solvent(s) of step b) to the solution of step a), the resulting solvent proportion being adjusted such that the one or more flavoring and/or aromatic substances from group i) independently of one another have in each case a log Pow* value of greater than or equal to 1.20, and the log Pow* value is calculated as follows:

log Pow*=log Pow−$x$*P'($x$)/log Pow where log Pow is the decimal logarithm of the distribution coefficient of the flavoring and/or aromatic substance between 1-octanol to water, where $x$ is the resulting solvent proportion based on the total volume proportion, normalized as 1.0, and where P'(x) is the polarity parameter for the corresponding solvent in the resulting solvent proportion x, d) preparation of an adsorption material in a suitable apparatus, e) passing the solution of step c) through an apparatus with adsorption material from step d) so that predominantly the one or more flavoring and/or aromatic substances which convey a positive sensory impression are adsorbed on the absorption material, f) preparation of one, two or more solvents suitable for foodstuffs, and g) desorption of the flavoring and/or aromatic substances from the adsorption material of step e) with the solvent(s) of step f), such that in the resulting flavoring concentrate the one or more flavoring and/or aromatic substances from group i), compared to the one or more flavoring and/or aromatic substances from group ii), are present in a higher concentration, independently of one another, in each case by a factor of 1.5 or more than in the aqueous flavoring of step a).

Alternatively, the present invention further relates to a process for the concentration of one or more flavoring and/or aromatic substances which convey a positive sensory impression in a resulting flavoring concentrate independently of one another in each case by a factor of 1.5 or more, compared to one or more flavoring and/or aromatic substances which convey a negative sensory impression, based on an aqueous flavoring, comprising or consisting of the following steps:

a) preparation of an aqueous flavoring comprising
  i) one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z, 7Z-tridecatrienal, 2E,5Z-undecadienal, nonanal, 4-ocanolide, 5-octanolide, phenylethanol, wine lactone and menthofurolactones,
  ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid,
  the proportion of solvent, based on the total volume of the aqueous solution, being present within a range of from 0% by volume to less than 1% by volume, b) preparation of an adsorption material in a suitable apparatus, c) passing the solution of step a) through the apparatus with adsorption material of step b) so that the one or more flavoring and/or aromatic substances from group i) and also the one or more flavoring and/or aromatic substances from group ii) are adsorbed on the absorption material, d) preparation of one or more solvents or solvent mixtures with water, the solvents or solvent mixtures being selected such that one or more flavoring and/or aromatic substances from group ii) have a log Pow* value of 1.20 or less, and e) desorption of the flavoring and/or aromatic substances from the adsorption material of step c) with the solvents or the solvent mixtures of step d), one, two, three, four, five, six, seven or more fractions being collected over time and one of these fractions or a mixture of two, three, four, five, six, seven or more of these fractions forming the flavoring concentrate, and in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more than in the aqueous flavoring of step a), the solvent or solvents used for desorption being selected such that the flavoring and/or aromatic substances to be desorbed have a log Pow* value of 1.20 or less and the log Pow* value is calculated as follows:

$$\log Pow^* = \log Pow - x^*P'(x)/\log Pow$$

where log Pow is the decimal logarithm of the distribution coefficient of the flavoring and/or aromatic between 1-octanol to water, where x is the resulting solvent proportion based on the total volume proportion, normalized as 1.0, and where P'(x) is the polarity parameter for the corresponding solvent in the resulting solvent proportion x.

The subject-matters of the present invention are based on the understanding that with the following formulae 1 and 2, it is possible to adjust the solvent proportion in an aqueous flavoring in step c) of the adsorption process according to the invention or the solvent proportion in the desorbing agent in step e) of the desorption process according to the invention in order to achieve a concentration according to the invention of the flavoring and/or aromatic substance(s) from group i) independently of one another, in each case by a factor of 1.5 or more, compared to the flavoring and/or aromatic substance(s) from group ii), based on the aqueous flavoring of step a).

$$P'(x) = P(water) \times P(solvent)/(P(solvent) - x^*(P(solvent) - P(water))) \quad \text{Formula 1}$$

where P(water) is the polarity parameter for water, determined according to Snyder and disclosed in "Flüssigkeitschromatographie HPLC—Theorie und Praxis", Günter J. Eppert, Friedr. Vieweg & Sohn Verlagsgesellschaft mbH, Braunschweig/Wiesbaden 1997, page 84, and P(solvent) denotes the polarity parameters for the corresponding solvents, also disclosed in the above mentioned book.

$$\text{Log Pow}^* = \log Pow^* - x^*P'(x)/\log Pow \quad \text{Formula 2}$$

where log Pow is the decimal logarithm of the distribution coefficient of a substance between 1-octanol and water, x is the resulting solvent proportion based on the total volume proportion, normalized as 1.0, and P'(x) is the polarity parameter for the corresponding solvent for the solvent proportion x.

The inventors have surprisingly found that the log Pow* value makes it possible to predict for the respective flavoring and/or aromatic substances the proportion in which the respective flavoring and/or aromatic substance adsorbs on the adsorption material in the aqueous phase for a given solvent proportion or remains in the aqueous phase.

The theory of the distribution of a substance between 1-octanol and water states that with a log Pow value of 0.0, a proportion of 50% of the substance considered in isolation is dissolved in 1-octanol and a proportion of 50% is dissolved in water.

The log Pow* values calculated by the above mathematical formulae present indications of how one or more flavoring and/or aromatic substances are distributed between the adsorption material (corresponding to an assumed equivalent to 1-octanol) and water.

It is true that the above mathematical formulae can merely approximately represent the complex interactions existing between the flavoring and/or aromatic substances themselves as well as with respect to the adsorption material used. However, diverse experiments in respect of the present invention have been able to confirm that a flavoring concentrate according to the invention, in which the one or more flavoring and/or aromatic substances from group i) which convey a positive sensory impression are more highly concentrated, based on the aqueous flavoring, in the resulting flavoring concentrate, independently of one another, in each case by a factor of 1.5 or more, compared to the one or more flavoring and/or aromatic substances from group ii) which convey a negative sensory impression, if during the adsorption procedure of the adsorption process according to the invention, the proportion of one or more solvents is adjusted such that the log Pow* values of the flavoring and/or aromatic substance(s) from group i) independently of one another are greater than or equal to 1.20. In a preferred embodiment of the adsorption process according to the invention, the proportion of solvent in step c) is simultaneously selected such that one or more flavoring and/or aromatic substances from group ii), which convey a negative sensory impression, have a log Pow* value of less than 1.20, preferably 1.1 or less, more preferably 1.0.

It has been found for the desorption process according to the invention that it is possible to prepare a flavoring concentrate according to the invention if the proportion of one or more solvents or solvent mixtures with water is selected during desorption such that one or more flavoring and/or aromatic substances from group ii), which are adsorbed on the adsorption material and convey a negative sensory impression, have a log Pow* value of 1.20 or less, preferably a log Pow* value of 1.15 or less, more preferably a log Pow* value of 1.0 or less, such that one, two, three, four, five, six, seven or more fractions are collected over time and one of these fractions or a mixture of two, three, four, five, six, seven or more of these fractions form the flavoring concentrate according to the invention, the resulting flavoring concentrate being characterized in that the one or more flavoring and/or aromatic substances from group i) compared to the one or more flavoring and/or aromatic substances from group ii) are present in a higher concentration, independently of one another, in each case by a factor of 1.5 or more, than in the originally used aqueous flavoring. In a preferred embodiment of the desorption process according to the invention, the solvents or solvent mixtures in step d) are simultaneously selected such that one or more flavoring and/or aromatic substances from group i), which convey a positive sensory impression, have a log Pow* value of 1.20 or more, preferably 1.30 or more, more preferably 1.50 or more.

As described above, the solvent proportion can also be varied during the desorption procedure of the desorption process according to the invention in that the solvent proportion increases continuously or discontinuously over the time of the desorption procedure (solvent gradient) so that one, two, three, four, five, six, seven or more fractions are collected over time and one of these fractions or a mixture of two, three, four, five, six, seven or more of these fractions form the flavoring concentrate according to the invention, and in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more, than in the aqueous flavoring.

The following Table 1 shows the polarity parameters (P or P' for the solvent mixtures) of selected solvents according to the invention, namely n-propanol, ethanol, ethylacetate, methanol and water.

TABLE 1

| Substance | X P | 0.02 P' | 0.04 P' | 0.06 P' | 0.08 P' | 0.1 P' | 0.2 P' |
|---|---|---|---|---|---|---|---|
| n-propanol | 4 | 9.893 | 9.605 | 9.332 | 9.075 | 8.831 | 7.786 |
| Ethanol | 4.3 | 9.928 | 9.669 | 9.424 | 9.191 | 8.969 | 8.004 |
| Ethylacetate | 4.4 | 9.938 | 9.689 | 9.452 | 9.227 | 9.012 | 8.072 |
| Methanol | 5.1 | 10.000 | 9.808 | 9.623 | 9.444 | 9.273 | 8.500 |
| Water | 10.2 | | | | | | |

| Substance | 0.3 P' | 0.4 P' | 0.5 P' | 0.6 P' | 0.7 P' | 0.8 P' | 0.9 P' | 1 P' |
|---|---|---|---|---|---|---|---|---|
| n-propanol | 6.962 | 6.296 | 5.746 | 5.285 | 4.892 | 4.554 | 4.259 | 4.000 |
| Ethanol | 7.226 | 6.586 | 6.050 | 5.594 | 5.203 | 4.863 | 4.564 | 4.300 |
| Ethylacetate | 7.309 | 6.679 | 6.148 | 5.695 | 5.305 | 4.965 | 4.665 | 4.400 |
| Methanol | 7.846 | 7.286 | 6.800 | 6.375 | 6.000 | 5.667 | 5.368 | 5.100 |
| Water | | | | | | | | |

The following Table 2 shows the influence of the polarity parameter calculated in Table 1 based on the above Formula 1 on the log Pow value of various sensorily-active flavoring and/or aromatic substances using Formula 2 described above.

TABLE 2

| Substance | log Pow | Solvent | P' 2% | P' 4% | P' 6% | P' 8% | P' 10% |
|---|---|---|---|---|---|---|---|
| Diacetyl | −1.33 | Ethanol | −1.48 | −1.62 | −1.76 | −1.88 | −2.00 |
| Furfuryl alcohol | 0.28 | Ethanol | −0.43 | −1.10 | −1.74 | −2.35 | −2.92 |
| Methylmercaptan | 0.65 | Ethanol | 0.34 | 0.05 | −0.22 | −0.48 | −0.73 |
| Furfural | 0.73 | Ethanol | 0.46 | 0.20 | −0.04 | −0.28 | −0.50 |
| Butanol | 0.88 | Ethanol | 0.65 | 0.44 | 0.24 | 0.04 | −0.14 |
| 3-mebutanol | 1.28 | Ethanol | 1.12 | 0.98 | 0.84 | 0.71 | 0.58 |
| 2-mebutanol | 1.29 | Ethanol | 1.14 | 0.99 | 0.85 | 0.72 | 0.59 |
| Phenol | 1.48 | Ethanol | 1.35 | 1.22 | 1.10 | 0.98 | 0.87 |
| Linalooloxide | 1.56 | Ethanol | 1.43 | 1.31 | 1.20 | 1.09 | 0.99 |
| Ethyldimethylpyrazine | 1.60 | Ethanol | 1.48 | 1.36 | 1.25 | 1.14 | 1.04 |
| 2E-hexenal | 1.61 | Ethanol | 1.49 | 1.37 | 1.26 | 1.15 | 1.05 |
| Benzaldehyde | 1.64 | Ethanol | 1.52 | 1.40 | 1.30 | 1.19 | 1.09 |
| 2E-hexenol | 1.75 | Ethanol | 1.64 | 1.53 | 1.43 | 1.33 | 1.24 |

TABLE 2-continued

| Substance | | | | | | |
|---|---|---|---|---|---|---|
| Butylacetate | 1.77 | Ethanol | 1.66 | 1.55 | 1.45 | 1.35 | 1.26 |
| Ethylbutyrate | 1.77 | Ethanol | 1.66 | 1.55 | 1.45 | 1.35 | 1.26 |
| Furfurylthiol-2 | 1.90 | Ethanol | 1.80 | 1.70 | 1.60 | 1.51 | 1.43 |
| Hexanal | 1.97 | Ethanol | 1.87 | 1.77 | 1.68 | 1.60 | 1.51 |
| Isopropylmethoxypyrazine | 2.09 | Ethanol | 1.99 | 1.90 | 1.82 | 1.74 | 1.66 |
| Methyl jasmonate | 2.12 | Ethanol | 2.03 | 1.94 | 1.85 | 1.77 | 1.70 |
| Indole | 2.14 | Ethanol | 2.05 | 1.96 | 1.88 | 1.80 | 1.72 |
| Methylcapronate | 2.30 | Ethanol | 2.21 | 2.13 | 2.05 | 1.98 | 1.91 |
| Ethylmethylbutyrate-2 | 2.38 | Ethanol | 2.30 | 2.22 | 2.14 | 2.07 | 2.00 |
| gamma-decalactone | 2.38 | Ethanol | 2.30 | 2.22 | 2.14 | 2.07 | 2.00 |
| delta decalactone | 2.42 | Ethanol | 2.34 | 2.26 | 2.19 | 2.12 | 2.05 |
| Jasmine lactone | 2.47 | Ethanol | 2.39 | 2.31 | 2.24 | 2.17 | 2.11 |
| Vinylguaiacol | 2.48 | Ethanol | 2.40 | 2.32 | 2.25 | 2.18 | 2.12 |
| Hexylacetate | 2.83 | Ethanol | 2.76 | 2.69 | 2.63 | 2.57 | 2.51 |
| Methylpropyldisulfide | 2.83 | Ethanol | 2.76 | 2.69 | 2.63 | 2.57 | 2.51 |
| Octanal | 3.03 | Ethanol | 2.96 | 2.90 | 2.84 | 2.79 | 2.73 |
| Citral | 3.17 | Ethanol | 3.11 | 3.05 | 2.99 | 2.94 | 2.89 |
| Linalool | 3.28 | Ethanol | 3.22 | 3.16 | 3.11 | 3.06 | 3.01 |
| beta-ionone | 3.85 | Ethanol | 3.80 | 3.75 | 3.70 | 3.66 | 3.62 |
| alpha-ionone | 3.86 | Ethanol | 3.81 | 3.76 | 3.71 | 3.67 | 3.63 |
| Dipropyldisulfide | 3.90 | Ethanol | 3.85 | 3.80 | 3.76 | 3.71 | 3.67 |
| p-menthenethiol-1,8 | 4.04 | Ethanol | 3.99 | 3.94 | 3.90 | 3.86 | 3.82 |
| Nootkatone | 4.10 | Ethanol | 4.05 | 4.01 | 3.96 | 3.92 | 3.88 |
| beta-damascenone | 4.40 | Ethanol | 4.35 | 4.31 | 4.27 | 4.23 | 4.20 |
| Dipropyltrisulfide | 5.05 | Ethanol | 5.01 | 4.97 | 4.94 | 4.90 | 4.87 |

| Substance | P' 30% | P' 40% | P' 50% | P' 60% | P' 70% | P' 80% | P' 90% | P' 100% |
|---|---|---|---|---|---|---|---|---|
| Diacetyl | −2.96 | −3.31 | −3.60 | −3.85 | −4.07 | −4.25 | −4.42 | −4.56 |
| Furfuryl alcohol | −7.46 | −9.13 | −10.52 | −11.71 | −12.73 | −13.61 | −14.39 | −15.08 |
| Methylmercaptan | −2.68 | −3.40 | −4.00 | −4.51 | −4.95 | −5.33 | −5.67 | −5.97 |
| Furfural | −2.24 | −2.88 | −3.41 | −3.87 | −4.26 | −4.60 | −4.90 | −5.16 |
| Butanol | −1.58 | −2.11 | −2.56 | −2.93 | −3.26 | −3.54 | −3.79 | −4.01 |
| 3-methylbutanol | −0.41 | −0.78 | −1.08 | −1.34 | −1.57 | −1.76 | −1.93 | −2.08 |
| 2-methylbutanol | −0.39 | −0.75 | −1.05 | −1.31 | −1.53 | −1.73 | −1.89 | −2.04 |
| Phenol | 0.02 | −0.30 | −0.56 | −0.79 | −0.98 | −1.15 | −1.30 | −1.43 |
| Linalooloxide | 0.17 | −0.13 | −0.38 | −0.59 | −0.77 | −0.93 | −1.07 | −1.20 |
| Ethyldimethylpyrazine | 0.25 | −0.05 | −0.29 | −0.50 | −0.68 | −0.83 | −0.97 | −1.09 |
| 2E-hexenal | 0.26 | −0.03 | −0.27 | −0.47 | −0.65 | −0.81 | −0.94 | −1.06 |
| Benzaldehyde | 0.32 | 0.03 | −0.20 | −0.41 | −0.58 | −0.73 | −0.86 | −0.98 |
| 2E-hexenol | 0.51 | 0.24 | 0.02 | −0.17 | −0.33 | −0.47 | −0.60 | −0.71 |
| Butylacetate | 0.55 | 0.28 | 0.06 | −0.13 | −0.29 | −0.43 | −0.55 | −0.66 |
| Ethylbutyrate | 0.55 | 0.28 | 0.06 | −0.13 | −0.29 | −0.43 | −0.55 | −0.66 |
| Furfurylthiol-2 | 0.76 | 0.51 | 0.31 | 0.13 | −0.02 | −0.15 | −0.26 | −0.36 |
| Hexanal | 0.87 | 0.63 | 0.43 | 0.27 | 0.12 | 0.00 | −0.12 | −0.21 |
| Isopropylmethoxypyrazine | 1.05 | 0.83 | 0.64 | 0.48 | 0.35 | 0.23 | 0.12 | 0.03 |
| Methyl jasmonate | 1.10 | 0.88 | 0.69 | 0.54 | 0.40 | 0.29 | 0.18 | 0.09 |
| Indole | 1.13 | 0.91 | 0.73 | 0.57 | 0.44 | 0.32 | 0.22 | 0.13 |
| Methylcapronate | 1.36 | 1.15 | 0.98 | 0.84 | 0.72 | 0.61 | 0.51 | 0.43 |
| Ethylmethylbutyrate-2 | 1.47 | 1.27 | 1.11 | 0.97 | 0.85 | 0.75 | 0.65 | 0.57 |
| gamma-decalactone | 1.47 | 1.27 | 1.11 | 0.97 | 0.85 | 0.75 | 0.65 | 0.57 |
| delta decalactone | 1.52 | 1.33 | 1.17 | 1.03 | 0.92 | 0.81 | 0.72 | 0.64 |
| Jasmine lactone | 1.59 | 1.40 | 1.25 | 1.11 | 1.00 | 0.90 | 0.81 | 0.73 |
| Vinylguaiacol | 1.61 | 1.42 | 1.26 | 1.13 | 1.01 | 0.91 | 0.82 | 0.75 |
| Hexylacetate | 2.06 | 1.90 | 1.76 | 1.64 | 1.54 | 1.46 | 1.38 | 1.31 |
| Methylpropyldisulfide | 2.06 | 1.90 | 1.76 | 1.64 | 1.54 | 1.46 | 1.38 | 1.31 |
| Octanal | 2.31 | 2.16 | 2.03 | 1.92 | 1.83 | 1.75 | 1.67 | 1.61 |
| Citral | 2.49 | 2.34 | 2.22 | 2.11 | 2.02 | 1.94 | 1.87 | 1.81 |
| Linalool | 2.62 | 2.48 | 2.36 | 2.26 | 2.17 | 2.09 | 2.03 | 1.97 |
| beta-ionone | 3.29 | 3.17 | 3.06 | 2.98 | 2.90 | 2.84 | 2.78 | 2.73 |
| alpha-ionone | 3.30 | 3.18 | 3.08 | 2.99 | 2.92 | 2.85 | 2.80 | 2.75 |
| Dipropyldisulfide | 3.34 | 3.22 | 3.12 | 3.04 | 2.97 | 2.90 | 2.85 | 2.80 |
| p-menthenethiol-1,8 | 3.50 | 3.39 | 3.29 | 3.21 | 3.14 | 3.08 | 3.02 | 2.98 |
| Nootkatone | 3.57 | 3.46 | 3.36 | 3.28 | 3.21 | 3.15 | 3.10 | 3.05 |
| beta-damascenone | 3.91 | 3.80 | 3.71 | 3.64 | 3.57 | 3.52 | 3.47 | 3.42 |
| Dipropyltrisulfide | 4.62 | 4.53 | 4.45 | 4.39 | 4.33 | 4.28 | 4.24 | 4.20 |

It can be seen from Table 2 that as the proportion of solvent increases during the adsorption procedure, so the log Pow* values fall in principle, i.e. the proportion of flavoring and/or aromatic substances which remains in the aqueous flavoring and does not adsorb on the adsorption agent, increases. Diacetyl which is highly polar has a very high affinity to water. The addition of a solvent to water slightly increases the non-polar nature of the mixture. Thus, although the log Pow* values of diacetyl also become more negative, they do not increase as much as the log Pow* values of those substances which have a positive log Pow value.

According to the present invention, the term "aqueous flavoring" means a solution, emulsion or suspension which has a water proportion of at least 95%, based on the total volume of the aqueous flavoring, said aqueous flavoring comprising one or more of the flavoring and/or aromatic substances from group i) as well as one or more of the flavoring and/or aromatic substances from group ii). The flavoring and/or aromatic substances are usually in a concentration of 0.001 to 1000 ppm, based on the total volume of the aqueous flavoring. The aqueous flavorings which are prepared in step a) of the absorption and desorption processes according to the invention can be of natural or synthetic origin.

According to the present invention, the term "flavoring concentrate" means a solution, emulsion or suspension which comprises one or more of the flavoring and/or aromatic substances from group i) in a higher concentration, based on the aqueous flavoring, independently of one another in each case by a factor of 1.50 or more, compared to one or more flavoring and/or aromatic substances from group ii). The proportion of flavoring and/or aromatic substances is usually within a range of from 0.1 to 20%, preferably from 1 to 15%, more preferably from 2 to 10%. Depending upon the process, the flavoring concentrate according to the invention can contain water, can be diluted with further proportions of water or other solvents or can be partly or completely concentrated by conventional processes, by distilling off the mixture containing water and/or solvent. Flavoring concentrates according to the invention are usually used in products according to the invention, in particular in foodstuff, enjoyment food, beverage, semi-finished food, oral hygiene, cosmetic or pharmaceutical products as top note flavorings.

Within the context of the present invention, the concentration ratio according to which "the one or more flavoring and/or aromatic substances from group i) are present in the resulting flavoring concentrate in a higher concentration, based on the aqueous flavoring, independently of one another, in each case by a factor of 1.5 or more, compared to one or more flavoring and/or aromatic substances from group ii)" means that in the aqueous flavoring, the proportion of one or more flavoring and/or aromatic substances from group i), compared to one or more flavoring and/or aromatic substances from group ii) is approximately the same or is higher than in the flavoring concentrate according to the invention.

This is shown in an exemplary manner by the values of the following Table 3 which states the concentrations of various conventional ingredients of an aqueous orange solution as well as a flavoring concentrate according to the invention which is produced therefrom. The flavoring concentrate according to the invention was obtained according to the invention by the adsorption process in that the aqueous flavoring was adjusted such that it had a volume fraction of 2% ethanol (corresponding to step c) of the adsorption process according to the invention) and was passed through an apparatus with adsorption material according to the present inventive process. Desorption was carried out using pure, non-denatured ethanol (96.5% by volume).

TABLE 3

| Name MI | "aqueous flavoring" [ppm] | "flavoring concentrate" [ppm] | concentration [-times] |
| --- | --- | --- | --- |
| Linalool | 74.6 | 3398.5 | 46 |
| 2-methylbutanol | 15.9 | 235.1 | 15 |
| 2E-hexenal | 10.7 | 282.5 | 26 |
| Octanal | 7.0 | 214.5 | 31 |
| Butanol | 4.6 | 55.4 | 12 |
| Geranial | 2.4 | 105.3 | 44 |
| Neral | 2.0 | 104.6 | 52 |
| Diacetyl | 0.5 | 0.0 | 0.0 |

It can be inferred from Table 3 that apart from diacetyl, all the flavoring and/or aromatic substances are concentrated. The flavoring and/or aromatic substances from group ii) which convey a negative sensory impression, namely butyl alcohol (approximately 12 times concentrated) and 2-methylbutanol (approximately 15 times concentrated), are less highly concentrated by a factor of 1.7 than the flavoring and/or aromatic substances from group i) which convey a positive sensory impression, namely 2-E-hexenal (approximately 26 times concentrated), octanal (approximately 31 times concentrated), geranial (approximately 44 times concentrated), linalool (approximately 46 times concentrated) and neral (approximately 52 times concentrated).

If one or more flavoring and/or aromatic substances from group i) are mentioned in the present invention, including the preferred embodiments, then one, two, three, four, five, six, seven, eight, nine, ten or more, preferably two or more, more preferably five or more flavoring and/or aromatic substances are usually disclosed.

According to the present invention, the flavoring and/or aromatic substances from group i) are flavoring and/or aromatic substances which convey positive sensory impressions for the following products in particular, but also for other products which comprise these ingredients:

| | |
| --- | --- |
| Strawberry: | ethylbutyrate, ethylmethylbutyrate-2, methylcapronate, linalool, gamma-decalactone, |
| Raspberry: | alpha and beta-ionone, delta-decalactone, hydroxybenzylacetone, 3Z-hexenol, |
| Apple: | 2E-hexenol, 3Z-hexenol, 2E-hexenal, hexanal, ethylbutyrate, ethylmethylbutyrate-2, beta-damascenone, |
| Orange: | ethylbutyrate, methylbutyrate, octanal, hexanal, linalool, |
| Grapefruit: | nootkatone, ethylbutyrate, linalool, p-menthenethiol-1,8, |
| Lemon: | citral, geraniol, caryophyllene, |
| Cherry: | benzaldehyde, 2E-hexenol, 2E-hexenal, hexanal, beta-damascenone, |
| Peach: | gamma-decalactone, 2E-hexenol, beta-damascenone, linalooloxide, |
| Banana: | isoamylacetate, |
| Pear: | ethyl-2E,4Z-decadienoate, |
| Blackcurrant: | 8-mercapto-p-menth-1-en-3-one, |
| Coffee: | beta-damascenone, furfurylthiol-2, 4-vinylguaiacol, isomeric isopropylmethoxypyrazine, isomeric ethyldimethylpyrazine, |
| Green tea: | 3-Z-hexenol, indole, methyl jasmonate, jasmine lactone, |
| Onion: | dipropyldisulfide, dipropyltrisulfide, methylpropyldisulfide, |
| Meat: | 2E,4Z,7Z-tridecatrienal, 2E,5Z-undecadienal, 2E,4Z-decadienal, |
| Rice: | 2-acetyl-1-pyrroline, octanal, nonanal, |
| Milk: | 1-octen-3-one, 1-octen-3-ol, 4-octanolide, 5-octanolide, |
| Tomato: | 3Z-hexenol, beta-damascenone, |
| Mint: | L-menthol, menthone, L-carvone, |

| Beer: | isoamylacetate, phenylethanol, ethylbutyrate, and |
|---|---|
| Wine: | wine lactone, menthofurolactones. |

In a further preferred embodiment, the one or more flavoring and/or aromatic substances are selected from one of the groups of strawberry, raspberry, apple, orange, grapefruit, cherry, peach, coffee, green tea and onion, meat, rice, milk, whey, tomato, mint, beer and wine, as defined above.

In the context of the present invention, one or more flavoring and/or aromatic substances from group ii) which convey a negative sensory impression means that one, two, three, four, five, six, seven, eight, nine, ten or more, preferably two or more, more preferably three or more, more preferably five or more such flavoring and/or aromatic substances are disclosed.

According to a further preferred embodiment of the present invention, the one or more flavoring and/or aromatic substances from group ii) comprise one or more compounds selected from the group consisting of low-molecular-weight $C_1$-$C_5$ alcohols, preferably methanol, ethanol, 1-butanol, 2-methylbutanol, 3-methylbutanol; diacetyl, acetaldehyde, lactic acid and acetic acid, if one or more flavoring and/or aromatic substances from group i) are selected from ethylbutyrate, methylbutyrate, octanal, hexanal, linalool, nootkatone, p-menthenethiol-1,8, benzaldehyde, 2E-hexenol, 2E-hexenal, hexanal, beta-damascenone, gamma-decalactone and linalool oxide.

According to a further preferred embodiment of the present invention, the one or more flavoring and/or aromatic substances from group ii) comprise furfural and/or furfuryl alcohol, if one or more flavoring and/or aromatic substances from group i) are selected from beta-damascenone, furfurylthiol, 4-vinylguaiacol, isopropylmethoxypyrazine and ethyldimethylpyrazine.

According to a further preferred embodiment of the present invention, the one or more flavoring and/or aromatic substances from group ii) comprise phenol, if one or more flavoring and/or aromatic substances from group i) are selected from 3Z-hexenol, indole, methyl jasmonate and jasmine lactone.

According to a further preferred embodiment of the present invention, the one or more flavoring and/or aromatic substances from group ii) comprise methylmercaptan, if one or more flavoring and/or aromatic substances from group i) are selected from dipropyldisulfide, dipropylsulfide and methylpropyldisulfide.

According to the invention, in step c) of the adsorption process according to the invention, the solvent proportion for a solvent which is not water is adjusted such that the log Pow* value of one or more flavoring and/or aromatic substances from group i), including the above mentioned preferred embodiments, independently of one another is in each case 1.20 or more, preferably 1.50 or more, more preferably 1.70 or more and most preferably 1.80 or more. Adjustment of the solvent proportion in step c) of the adsorption process according to the invention to this log Pow* value produces a concentration according to the invention of the flavoring and/or aromatic substances from group i) and at the same time a lower concentration by a factor of 1.5 or more of one or more flavoring and/or aromatic substances from group ii).

According to a preferred embodiment of the inventive adsorption process, in step c) the solvent proportion is simultaneously adjusted such that one or more flavoring and/or aromatic substances from group ii) which convey a negative sensory impression, have in each case, independently of one another, a log Pow* value of less than 1.20. In order to shift the ratio of one or more flavoring and/or aromatic substances from group i) to the one or more flavoring and/or aromatic substances from group ii) in the resulting flavoring concentrate in favor of the flavoring and/or aromatic substances from group i), the log Pow* value of the flavoring and/or aromatic substance(s) from group ii) should preferably be 1.1 or less, more preferably 1.0 or less.

In a further preferred embodiment, an adsorption process according to the invention is particularly preferred when the solvent proportion in step c) is within a range of from 1% by volume to 6% by volume, more preferably from 2% by volume to 5% by volume, more preferably from 3% by volume to 4% by volume, based in each case on the resulting solution.

According to the present invention, in step d) all suitable adsorption materials can be used which are usually available for an adsorption/desorption process.

The apparatus suitable according to the invention is generally a column made of glass or stainless steel, the internal volume usually being within a range of from a few milliliters to a thousand liters, preferably from 1 L to 500 L, more preferably from 20 L to 400 L.

Preferred adsorption materials used in a column according to the invention are various crosslinked polystyrenes, preferably copolymers of ethylvinylbenzene and divinylbenzene, vinylpyrrolidone and divinylbenzene, vinylpyridine and divinylbenzene, styrene and divinylbenzene, but also other polymers, such as preferably polyaromatic substances, polystyrenes, poly(meth)acrylates, polypropylenes, polyesters and polytetrafluoroethylene, etc.

For the adsorption process according to the invention, the solvent(s) of step b) are preferably selected from the group consisting of methanol, ethanol, propanol and isopropanol.

It is further preferred that according to step f) of the adsorption process according to the invention, the solvent(s) are selected from the group consisting of methanol, ethanol, propanol, isopropanol, ethylacetate, diacetin, triacetin, liquid carbon dioxide, chlorofluorocarbons suitable for foodstuffs and vegetable triglycerides. Ethanol, propanol, isopropanol, ethylacetate, diacetin and triacetin are preferably used. It is more preferable that ethanol or isopropanol, and particularly preferable that ethanol is used as solvent in step f) of the adsorption process according to the invention. Ethanol is most particularly preferred, since the resulting flavoring concentrate can be used directly for the production of the products according to the invention without being distilled off beforehand and thus without the effect of temperature.

In a further preferred embodiment of the adsorption process according to the invention, the flow rate of the solution of step e) is adjusted within a range of from 0.1 to 2.5 cm/sec at least during part of the adsorption procedure in step c). In this context, the parameter of the flow rate is jointly responsible for the formation of the local distribution coefficients of the one or more flavoring and/or aromatic substances between the adsorption material and the aqueous flavoring. The flow rate is preferably within a range of from 0.2 to 1.5 cm/sec, more preferably from 0.4 to 0.9 cm/sec.

In a further preferred embodiment of the present adsorption process according to the invention, the temperature of the solution of step c) is within a range of from 0° C. to 80° C. at least during part of the adsorption procedure in step e) of the adsorption process according to the invention. The parameter of the temperature is likewise jointly responsible for the formation of the local distribution coefficient. A temperature range of from 10 to 50° C. is more preferred, a temperature range of from 20 to 40° C. being particularly preferred.

In a further preferred embodiment, the counterpressure inside the apparatus of step d) is within a range of from 0.1 bar to 4.0 bar during the adsorption procedure in step e). The counterpressure inside the apparatus of step d) is the pressure produced by the resistance of the adsorption material when the solution of step c) of the adsorption process according to the invention is pumped through the apparatus of step d). A counterpressure within a range of from 0.3 bar to 2.5 bar is preferred, a range of from 0.8 bar to 1.5 bar being particularly preferred.

In a further preferred embodiment of the present adsorption and/or desorption process according to the invention, the aqueous flavoring is transported in an apparatus to be used according to the invention using a (preferably compressed) gas. Preferred gases are inert gases, in particular the inert gases argon, nitrogen and carbon dioxide. The use of inert gases for assisting the transportation of the aqueous flavorings in the adsorption and/or desorption process according to the invention is particularly advantageous in the case of flavorings or flavoring substances which are susceptible to oxidation, i.e. are readily oxidizable.

If the adsorption and/or desorption process according to the invention is carried out without the use of inert gas, flavorings or flavoring substances susceptible to oxidation can undergo a change in the sensory profile, which can lead to the formation of undesirable notes (off notes). Sulfur-containing flavoring substances and specific substance classes known to a person skilled in the art, such as aldehydes, are particularly susceptible to oxidation. In this context, typical sulfur-containing flavoring substances include dipropyl sulfide, dipropenyl sulfide, diallyl sulfide, methyl propenyl sulfide, as well as corresponding di, tri and tetra sulfides of the mentioned sulfides. Mention is made in particular of the flavorings/flavoring substances of coffee, onions and other allium plants, as well as citrus fruits, for example orange, lemon or grapefruit, it being possible in particular for the sulfur-containing flavoring substances, and also aldehydes, to be protected from oxidation by the preferred process according to the invention. Flavorings/flavoring substances which are of particular relevance in this context are in particular furfuryl methyl sulfide and the disulfide thereof (especially in the area of onion flavorings), as well as furfuryl thiol-2 (especially in the area of coffee flavorings). Significant aldehydes which are relevant in terms of flavoring are in particular n-hexanal, 2E or 3Z hexenal, n-octanal, n-decanal, n-dodecanal and citral which are important flavoring constituents, particularly of citrus fruits.

Thus, a process according to the invention is also preferred in which, during the adsorption process and/or desorption process (see below), an inert gas is used to transport the liquid media, in particular to protect the mentioned flavorings or flavoring substances susceptible to oxidation. In contrast to the adsorption process according to the invention, in the desorption process according to the invention, no specific discrimination of flavoring and/or aromatic substances is carried out during the adsorption on the adsorption material in step c), but the discrimination of the one or more flavoring and/or aromatic substances from group ii) is carried out by specific desorption in step e) of the desorption process according to the invention, the solvent(s) used for desorption being selected such that the flavoring and/or aromatic substances to be desorbed have a log Pow* value of 1.20 or less.

In the following, preferred embodiments are presented in respect of the desorption process according to the invention. Insofar as information has already been provided above concerning the materials used according to the invention, for example the flavoring and/or aromatic substances from group i) or group ii), the aqueous flavoring, the resulting flavoring concentrate, the adsorption material, the suitable apparatus, the solvents, this information can also be applied to the desorption process according to the invention.

A preferred embodiment of the desorption process according to the invention is characterized in that the flow rate of the solution of step d) is within a range of from 1 to 5 cm/min at least during part of the desorption process in step e). The flow rate, described in connection with the adsorption process according to the invention, is not applied to the desorption process according to the invention.

In a further preferred embodiment, the temperature of the solution of step d) of the desorption process according to the invention is within a range of from 0° C. to 80° C. at least during part of the desorption process in step e). The temperature parameter is also jointly responsible for the formation of the local distribution coefficient. More preferred is a temperature range of from 10 to 50° C., in particular a temperature range of from 20 to 40° C.

In a further preferred embodiment, the desorption process according to the invention is characterized in that the counterpressure inside the apparatus of step b) is within a range of from 0.05 to 2.0 bar during the desorption procedure in step e). The counterpressure inside the apparatus of step b) is the pressure which arises through the resistance of the adsorption material when the solution in step e) of the desorption process according to the invention is pumped through the apparatus of step b) and is indicated by a manometer. A counterpressure within a range of from 0.1 bar to 1.5 bar is preferred, a range of from 0.2 to 1.0 bar being particularly preferred.

According to a further preferred embodiment of the adsorption and desorption processes according to the invention, the directions of the adsorption procedure and of the desorption procedure, i.e. steps d) and g) of the adsorption process according to the invention and steps c) and e) of the desorption procedure of the desorption process according to the invention, can be the same or opposite.

According to the present invention, a product suitable for consumption is preferably a foodstuff, an enjoyment food and/or a beverage which is intended to be introduced into the oral cavity, to remain there for a certain amount of time and then to either be swallowed, i.e. consumed (for example foodstuff) or removed again from the oral cavity (for example chewing gum). Also included here are all substances or products which are intended to be ingested in a processed, partially processed or unprocessed state by humans or animals. In this respect, all substances are also included which are added to the foodstuff during the production, processing or treatment thereof.

Chewing gums generally consist of a chewing gum base, i.e. a chewable mass which becomes malleable while being chewed, consisting of different types of sugar, sugar substitutes, sweeteners, sugar alcohols, humectants, thickeners, emulsifiers, encapsulated and/or non-encapsulated flavorings and/or stabilizers.

In addition to the traditionally used natural resins or the natural latex chicle gum, most current chewing gum bases also presently include elastomers, such as polyvinylacetate (PVA), polyethylene, (low or medium molecular weight) polyisobutene (PIB), polybutadiene, isobutene-isoprene copolymers (butyl rubber), polyvinylethylether (PVE), polyvinylbutyether, copolymers of vinyl esters and vinyl ethers, styrene-butadiene copolymers (styrene-butadiene rubber, SBR), or vinyl elastomers, for example based on vinylacetate/vinyllaurate, vinylacetate/vinylstearate or ethylene/vinylacetate, as well as mixtures of the mentioned elastomers, as described for example in EP 0 242 325, U.S. Pat. No. 4,518,615, U.S. Pat. No. 5,093,136, U.S. Pat. No. 5,266,336, U.S. Pat. No. 5,601,858 or U.S. Pat. No. 6,986,709. In addition, chewing gum bases comprise further constituents, for example (mineral) fillers, plasticizers, emulsifiers, antioxidants, waxes, fats or fatty oils, for example hardened (hydrogenated) vegetable or animal fats, mono, di or triglycerides. Suitable (mineral) fillers are, for example, calcium carbonate, titanium dioxide, silicon dioxide, talc, aluminum oxide, dicalcium phosphate, tricalcium phosphate, magnesium hydroxide and mixtures thereof. Suitable plasticizers or agents for preventing bonding (detackifiers) are, for example, lanolin, stearic acid, sodium stearate, ethylacetate, diacetin (glycerol diacetate), triacetin (glycerol triacetate) and triethylcitrate. Suitable waxes are, for example, paraffin waxes, candelilla wax, carnauba wax, microcrystalline waxes and polyethylene waxes. Suitable emulsifiers are, for example, phosphatides, such as lecithin, mono and digylcerides of fatty acids, for example glycerol monostearate.

Preferred aromatic products suitable for consumption (foodstuffs, enjoyment foods, beverages) are selected from the group consisting of bakery products, preferably selected from the group consisting of bread, dry biscuits, cakes and other cookies; confectionery, preferably selected from the group consisting of chocolate, chocolate bar products, other products in bar form, fruit gums, hard and soft caramels and chewing gum; alcoholic and non-alcoholic beverages, preferably selected from the group consisting of coffee, tea, wine, beverages containing wine, beer, beverages containing beer, liqueurs, schnapps, brandies, sodas containing fruit, isotonic beverages, soft drinks, nectars, fruit and vegetable juices and fruit or vegetable preparations; instant beverages, preferably selected from the group consisting of instant cocoa beverages, instant tea beverages and instant coffee beverages; meat products, preferably selected from the group consisting of ham, fresh or raw sausage preparations, and seasoned or marinated fresh or salt meat products; eggs or egg products, preferably selected from the group consisting of dried egg, egg white and egg yolk; cereal products preferably selected from the group consisting of breakfast cereals, muesli bars and precooked finished rice products; milk products, preferably selected from the group consisting of milk beverages, ice milk, yogurt, kefir, cream cheese, soft cheese, hard cheese, powdered milk, whey, butter, buttermilk and partially or fully hydrolyzed milk protein-containing products; products from soya protein or other soybean fractions, preferably selected from the group consisting of soya milk and products produced therefrom, soya lecithin-containing preparations, fermented products such as tofu or tempeh or products produced therefrom and soy sauces; fruit preparations, preferably selected from the group consisting of jams, sorbets, fruit sauces and fruit fillings; vegetable preparations, preferably selected from the group consisting of ketchup, sauces, dried vegetables, deep-frozen vegetables, precooked vegetables, vegetables in vinegar and preserved vegetables; snack foods, preferably selected from the group consisting of baked or fried potato chips or potato dough products, bread dough products and corn or peanut-based extrudates; fat and oil-based products or emulsions thereof, preferably selected from the group consisting of mayonnaise, remoulade, dressings and seasoning preparations; other ready meals and soups, preferably selected from the group consisting of powdered soups, instant soups, precooked soups, spices, seasoning mixtures and seasonings which are used, for example in the snacks sector. The total proportion of flavoring concentrates according to the invention and the preferred embodiments thereof in a product (suitable for consumption) according to the invention is generally, depending on the type of product, within a range of from 0.001 to 10000 ppm, preferably from 0.01 to 100 ppm in the final application.

The products suitable for consumption in the context of the present invention can also be used as semi-finished products for the production of further products (suitable for consumption) according to the invention, preferably foodstuffs, enjoyment foods and/or beverages. In this respect, the semi-finished products are used to flavor products produced therefrom as finished products. The total proportion of flavoring concentrates according to the invention in a semi-finished product according to the invention is normally, depending on the type of product, within a range of from 0.01 to 10000 ppm, preferably from 0.02 to 200 ppm.

Cosmetic or pharmaceutical preparations according to the invention can also be formulated as a "water-in-oil" (W/O) type emulsion, an "oil-in-water" (OIW) type emulsion or as multiple emulsions, for example of the water-in-oil-in-water (WIOIW) type, as a PIT emulsion, a Pickering emulsion, a micro-emulsion or nano-emulsion; emulsions which are particularly preferred are of the "oil-in-water" (Q/W) type or water-in-oil-in-water (WIOIW) type. The cosmetic preparations according to the invention can furthermore be formulated in particular as a pencil, stick, aerosol, spray, sprayable emulsions, foam, impregnation solution, for example for cosmetic wipes, cleansing agents such as cleansing milk, water, alcohol or glycol-based cleansing lotions, soap, synthetic detergents, skin care products, cream, lotion, milk, emulsion foam, micro or nano-emulsion, paste, gel (for example hydro or hydrodispersion gel), balsam, serum, roll-on, pump spray, aerosol (foaming, non-foaming or after-foaming), skin care products, foot care products (including keratolytics, deodorants), insect repellants, sunscreen, after-sun preparations, shaving products, hair removing products, hair care products, for example shampoo, 2-in-1 shampoo, anti-dandruff shampoo, baby shampoo, shampoo for a dry scalp, shampoo concentrate, conditioner, deep conditioner, hair tonic, hair rinse, hair fixing cream, perming and fixing products, hair smoothing products (straightening products, relaxers), setting lotions (spray), styling aid (for example gel), as bleaching agents, hair lighteners, hair conditioners, hair mousse, hair toner, deodorant and/or antiperspirant; mouthwash and oral irrigator, aftershave balm, pre- and aftershave lotion, eye care, make-up, make-up remover, baby articles, bathing articles (for example capsules) or masks.

In the present invention, the term oral hygiene products is understood as meaning formulations familiar to a person skilled in the art for cleaning and caring for the oral cavity and throat as well as for freshening breath. Known and currently used oral hygiene formulations include creams, gels, pastes, foams, emulsions, suspensions, aerosols, sprays as well as capsules, granules, lozenges, tablets, candy or chewing gum, without this list of administration forms or possibilities of use being restricted thereby. Formulations of this type are used to clean and care for the tooth substance and oral cavity as well as to freshen breath.

Oral hygiene products according to the invention are preferably selected from the group consisting of: toothpastes, dental gels, mouthwash, liquids for gargling, mouth or throat sprays (pump or aerosol spray), lozenges and tablets for sucking, candy, chewing gum, sweets for chewing and tooth-friendly chewing gums.

Oral hygiene products selected from the group consisting of toothpastes, dental gels, mouth or throat sprays (pump or aerosol spray), lozenges and tablets for sucking, candy, chewing gum, sweets for chewing and tooth-friendly chewing gums are more preferred.

Tooth care products (as an example of preparations according to the invention used for oral care) generally include an abrasive system (abrasive or polishing agent), for example silicic acids, calcium carbonates, calcium phosphates, aluminum oxides and/or hydroxylapatites, surface-active substances, for example sodium lauryl sulfate, sodium lauryl sarcosinate and/or cocamidopropylbetaine, humectants, for example glycerol and/or sorbitol, thickening agents, for example carboxymethyl cellulose, polyethylene glycols, carrageenan and/or Laponite®, sweeteners, for example saccharin, taste correctors for unpleasant taste sensations, taste correctors for further, normally not unpleasant taste sensations, taste-modulating substances (for example inositol phosphate, nucleotides such as guanosine monophosphate, adenosine monophosphate or other substances such as sodium glutamate or 2-phenoxypropionic acid), cooling active ingredients, for example menthol derivatives, (for example L-menthyllactate, L-menthylalkylcarbonates, menthone ketals, menthane carboxylic acid amides), 2,2,2-trialkylacetic acid amides (for example 2,2-diisopropylpropionic acid methyl amide), icilin and icilin derivatives, stabilizers and active ingredients, for example sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavorings and/or sodium bicarbonate or taste correctors.

The total proportion of flavoring concentrates according to the invention in an oral hygiene product according to the invention is normally, depending on the type of product, within a range of from 0.001 to 10000 ppm, preferably from 0.1 to 1000 ppm.

Products in the context of the present invention, preferably pharmaceutical products can also be present in the form of capsules, tablets (uncoated as well as coated tablets, for example enteric coatings), sugar-coated pills, granules, pellets, solids mixtures, dispersions in liquid phases, as emulsions, powders, solutions, pastes or as other preparations which can be swallowed or chewed or as food supplements.

Conventional basic substances, auxiliaries and/or additives are used as further constituents of the products according to the invention, in particular foodstuff and enjoyment products, beverages, semi-finished products, oral hygiene products, cosmetic or pharmaceutical products. These further constituents are preferably selected from the group consisting of water, mixtures of fresh or processed, animal or vegetable basic substances or raw materials, digestible or indigestible carbohydrates (for example sucrose, maltose, fructose, glucose, dextrins, amylose, amylopectin, inulin, xylanes, cellulose), sugar alcohols (for example sorbitol, mannitol, xylitol), natural or hardened fats (for example tallow, lard, palm oil, coconut butter, hardened vegetable fat), fatty oils (for example sunflower oil, peanut oil, corn oil, safflower oil, olive oil, walnut oil, fish oil, soya bean oil, sesame oil), fatty acids or the salts thereof (for example potassium stearate, potassium palmitate), proteinogenic or non-proteinogenic amino acids and related compounds (for example taurin, creatin, creatinin), peptides, native or processed proteins (for example gelatin), enzymes (for example peptidases), glucosidases, lipases, proteinases), nucleic acids, nucleotides (inositol phosphate), taste-modulating substances (for example sodium glutamate, 2-phenoxypropionic acid), emulsifiers (for example lecithins, diacylglycerols), stabilizers (for example carrageenan, alginate, carob flour, guar flour), preservatives (for example benzoic acid, sorbic acid), antioxidants (for example tocopherol, ascorbic acid), gelators (for example citric acid), organic or inorganic acidulants (malic acid, acetic acid, citric acid, tartaric acid, phosphoric acid), bitter principles (for example quinine, caffeine, limonine), sweeteners (for example saccharin, cyclamate, aspartame, neotame, neohesperidine dihydrochalcone), mineral salts (for example sodium chloride, potassium chloride, magnesium chloride, sodium phosphates), substances preventing enzymatic browning (for example sulfite, ascorbic acid), ethereal oils, plant extracts, natural or synthetic dyes or colored pigments (for example carotenoids, flavonoids, anthocyans, chlorophyll and derivatives thereof, spices and odoriferous substances, synthetic, natural or nature identical flavoring and/or aromatic substances.

The products according to the invention, in particular foodstuff and enjoyment food products, beverages, semi-finished, oral hygiene, cosmetic or pharmaceutical products, preferably oral hygiene products preferably comprise one or more basic substances, auxiliaries and/or additives from the following group:

Preservatives, abrasives (abrasive agents), further antibacterial agents, anti-inflammatory agents, irritation-preventing agents, irritation-inhibiting agents, further antimicrobial agents, antioxidants, astringents, antistatic agents, binders, (mineral) fillers, buffers, carrier materials, chelating agents, cleaning agents, care agents, surface-active substances, deodorizing agents, emulsifiers, enzymes, fibers, film formers (film-forming substances), fixatives, foam formers, anti-foam substances, foam stabilizers, foam boosters, gelling agents, gel forming agents, moisturizers, moistening substances, humectants, bleaching agents, lightening agents (for example hydrogen peroxide), impregnating agents, friction-reducing agents, lubricants, smell and/or taste modulating agents, smell and/or taste reducing agents, smell and/or taste enhancing agents, opacifiers, plasticizers, covering agents, brighteners, silicones, (mucous membrane) skin cooling agents (cooling active ingredients), (mucous membrane) skin calming agents, (mucous membrane) skin cleansing agents, (mucous membrane) skin care agents, (mucous membrane) skin healing agents, mucous membrane protection agents, UV filters, stabilizers, suspending agents, vitamins, fatty oils, waxes, fats, phospholipids, saturated fatty acids, mono- or polyunsaturated fatty acids, alpha-hydroxy acids, polyhydroxy acids, liquefiers, dyes, color-protecting agents, pigments, surfactants, electrolytes, silicone derivatives, polyols, organic solvents, silicic acid, calcium carbonate, calcium hydrogen phosphate, aluminum oxide, fluorides, zinc, tin, potassium, sodium and strontium salts, pyrophosphates, hydroxyapatites.

If the product preparation according to the invention is a solution or a lotion, the following can be used by way of example as solvents: water or aqueous solutions, oils, such as triglycerides of capric acid or caprylic acid or also alcohols, diols or polyols having a low C number as well as the ethers thereof, preferably ethanol, isopropanol, polypropylene glycol, glycerol, ethylene glycol. Mixtures of the above-mentioned solvents are used in particular.

Product preparations according to the invention, preferably those which are provided for use as dental or oral care products, are preferably free from cariogenic substances, in particular free from sucrose, glucose, lactose, hydrolyzed lactose, sorbose, arabinose, xylose, mannose, maltose, galactose, maltotriose and fructose.

In a further preferred embodiment, the products according to the invention, in particular foodstuff and enjoyment food products, beverages, semi-finished, oral hygiene, cosmetic or pharmaceutical products, comprise further flavoring and/or aromatic substances which are not stated in groups i) or ii), as stated above.

Thus, the further flavoring and/or aromatic substances in the context of the present invention comprise, inter alia, (mucous membrane) cooling agents, (mucous membrane) warming agents, hot tasting substances, sweeteners, sugar substitutes, organic or inorganic acidulants (for example malic acid, acetic acid, citric acid, tartaric acid, phosphoric acid), bitter principles (for example quinine, caffeine, limonine, amarogentin, humolones, lupolones, catechols, tannins) and edible mineral salts (for example sodium chloride, potassium chloride, magnesium chloride and sodium phosphates).

Suitable sugar substitutes which can be a constituent of the preparations according to the invention are sugar alcohols, for example mannitol, sorbitol and sorbitol syrup, isomalt (for example Palatinit®), maltite and maltite syrup, lactite, xylite, erythrite, leucrose, arabinol, arabitol, adonitol, alditol, ducitol, iditol, but also fructooligosacharides (for example Raftilose®, oligofructose or polydextrose.

Typical sweeteners which can be a constituent of the products according to the invention include saccharin (optionally as Na, K or Ca salt), aspartame (for example NutraSweet®), cyclamate (optionally as Na or Ca salt), acesulfam-K (for example Sunett®), thaumatin or neohesperidine-dihydrochalcone. Furthermore, other sweeteners, such as stevioside, rebaudioside A, glycyrrhizin, ultrasweet, osladin, brazzein, miraculin, pentadin, phyllodulcin, dihydrochalcone, arylureas, trisubstituted guanidines, glycyrrhizin, superaspartam, suosan, sucralose (trichlorogalactosesucrose, TGS), alitame, monellin or Neotame® can also be used.

Examples of preferred hot tasting and/or salivation-inducing substances and/or substances which cause a feeling of warmth and/or a tingling feeling on the skin or on the mucous membranes and which can be a constituent of the products according to the invention are: capsaicin, dihydrocapsaicin, gingerol, paradol, shogaol, piperine, carboxylic acid-N-vanillylamides, in particular nonanoic acid-N-vanillylamide, pellitorin or spilanthol, 2-nonanoic acid amides, in particular 2-nonanoic acid-N-isobutylamide, 2-nonanoic acid-N-4-hydroxy-3-methoxyphenylamide, alkyl ethers of 4-hydroxy-3-methoxybenzyl alcohol, in particular 4-hydroxy-3-methoxybenzyl-n-butylether, alkyl ethers of 4-acyloxy-3-methoxybenzyl alcohol, in particular 4-acetyloxy-3-methoxybenzyl-n-butylether and 4-acetyloxy-3-methoxybenzyl-n-hexylether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylene dioxybenzyl alcohol, (4-hydroxy-3-methoxyphenyl)acetic acid amides, in particular (4-hydroxy-3-methoxyphenyl)acetic acid-N-n-octylamide, vanillomandelic acid alkylamides, ferulic acid-phenethylamides, nicotinaldehyde, methylnicotinate, propylnicotinate, 2-butoxyethylnicotinate, benzylnicotinate, 1-acetoxychavicol, polygodial and isodrimeninol, further preferred cis- and/or trans-pellitorin according to WO 2004/000787 or WO 2004/043906, alkenecarboxylic acid-N-alkylamides according to WO 2005/044778, mandelic acid alkylamides according to WO 03/106404 or alkyloxyalkanoic acid amides according to WO 2006/003210.

Examples of preferred hot tasting natural extracts and/or natural extracts which cause a feeling of warmth and/or a tingling feeling on the skin or on the mucous membranes and which can be a constituent of the products according to the invention are: extracts of paprika, extracts of pepper (for example capsicum extract), extracts of chili pepper, extracts of ginger roots, extracts of *Aframomum melgueta*, extracts of *Spilanthes-acmella*, extracts of *Kaempferia galangal* or extracts of *Alpinia galanga*.

Preferred substances for masking one or more unpleasant taste sensations, in particular a bitter, astringent and/or metallic taste sensation or aftertaste, which substances can be a constituent of the products according to the invention, are as follows: lactisol[20-(4-methoxyphenyl) lactic acid] (cf. U.S. Pat. No. 5,045,336), 2,4-dihydroxybenzoic acid potassium salt (cf. U.S. Pat. No. 5,643,941), ginger extracts (cf. GB 2,380,936), neohesperidine dihydrochalcone (cf. Manufacturing Chemist 2000, July issue, p. 16-17), specific flavones (2-phenylchrom-2-en-4-ones) (cf. U.S. Pat. No. 5,580,545), specific nucleotides, for example cytidine-5'-monophosphates (CMP) (cf. US 2002/0177576), specific sodium salts, such as sodium chloride, sodium citrate, sodium acetate and sodium lactate (cf. Nature, 1997, Vol. 387, p. 563), a lipoprotein of β-lactoglobulin and phosphatidic acid (cf. EPA 635218), neodiosmine[5,7-dihydroxy-2-(4-methoxy-3-hydroxyphenyl)-7-O-neohesperidosyl-chrom-2-en-4-one] (cf. U.S. Pat. No. 4,154,862), preferably hydroxyflavanones according to EP 1 258 200, in turn preferred in this respect 2-(4-hydroxyphenyl)-5,7-dihydroxychroman-4-one (naringenin), 2-(3,4-dihydroxyphenyl)-5,7-dihydroxychroman-4-one (eriodictyol), 2-(3,4-dihydroxyphenyl)-5-hydroxy-7-methoxychroman-4-one (eriodictyol-7-methylether), 2-(3,4-dihydroxyphenyl)-7-hydroxy-5-methoxychroman-4-one (eriodictyol-5-methylether) and 2-(4-hydroxy-3-methoxyphenyl)-5,7-dihydroxychroman-4-one (homoeriodictyol), the (2S)- or (2R)-enantiomers thereof or mixtures thereof as well as the mono- or polyvalent phenolate salts thereof with $Na^+$, $K^+$, $NH_4^+$, $Ca^{2+}$, $Mg^{2+}$ or $Al^{3+}$ as counter cations or γ-aminobutyric acid (4-aminobutyric acid, as the neutral form ("inner salt") or in the carboxylate or ammonium form) according to WO 2005/096841.

Substances which taste bitter, astringent, cardboardy, dusty, dry, floury, rancid or metallic are, for example: xanthine alkaloids xanthines (caffeine, theobromine, theophylline), alkaloides (quinine, brucine, nicotine), phenolic glycosides (for example salicin, arbutin), flavonoid glycosides (for example hesperidine, naringin), chalcones and chalcone glycosides, hydrolysable tannins (gallic or ellagic acid esters of carbohydrates, for example pentagalloyl glucose), non-hydrolysable tannins (optionally galloylated catechols or epicatechols and oligomers thereof, for example proanthyocyanidines or procyanidines, thearubigin), flavones (for example quercetin, taxifolin, myricetin), other polyphenols (g-oryzanol, caffeic acid or esters thereof), terpenoid bitter principles (for example limonoids such as limonine or nomilin from citrus fruits, lupolones and humolones from hops, iridoids, secoiridoids), absinthin from wormwood, amarogentin from gentian, metal salts (potassium chloride, sodium sulfate, magnesium sulfate), certain pharmaceutical active ingredients (for example fluoroquinolone antibiotics, paracetamol, aspirin, beta-lactam antibiotics, ambroxol, propylthiouracil [PROP], guaifenesin), specific vitamins (for example vitamin H, vitamins from the B series, such as vitamin B1, B2, B6, B12, niacin, panthothenic acid), denatonium benzoate, sucralose octa-acetate, potassium chloride, magnesium salts, iron salts, aluminum salts, zinc salts, urea, unsaturated fatty acids, in particular unsaturated fatty acids in emulsions, amino acids (for example leucine, isoleucine, valine, tryptophan, proline, histidine, tyrosine, lysine and phenylalanine), peptides (in particular peptides having an amino acid from the group leucine, isoleucine, valine, tryptophan, proline or phenylalanine at the N- or C-terminus).

Substances which have a bitter, astringent, cardboardy, dusty, dry, floury, rancid or metallic aftertaste can belong, for example to the group of sweeteners or sugar substitutes. Examples include: aspartame, neotame, superaspartame, saccharin, sucralose, tagatose, monellin, stevioside, thaumatin, miraculin, glycyrrhizin and derivatives thereof, cyclamate and the pharmaceutically acceptable salts of the above-mentioned compounds.

Advantageous additives for working into the products according to the invention are emulsifiers (for example lecithins, diacylglycerols, gum arabic), stabilizers (for example carrageenan, alginate), preservatives (for example benzoic acid, sorbic acid), antioxidants (for example tocopherol, ascorbic acid), chelating agents (for example citric acid), plant extracts, natural or synthetic dyes or colored pigments (for example carotenoids, flavonoids, anthrocyans, chlorophyll and derivatives thereof).

Products according to the invention, in particular foodstuff and enjoyment food products, beverages, semi-finished, oral hygiene, cosmetic or pharmaceutical products can also contain antioxidants or substances which can reinforce an antioxidative effect, preferably naturally occurring tocopherols and derivatives thereof (for example vitamin E—acetate), vitamin C and the salts or derivatives thereof (for example ascorbyl palmitate, Mg—ascorbyl phosphate, ascorbyl acetate), vitamin A and derivatives (vitamin A—palmitate), tocotrienols, flavonoids, alpha-hydroxy acids (for example citric acid, lactic acid, malic acid, tartaric acid) and the Na, Ka and Ca salts thereof, flavonoids, quercetin, phenolic benzylamines, propyl gallate, octyl gallate, dodecyl gallate, butylhydroxyanisol (BHA, E320), butyl hydroxytoluene (BHT, 2,6-di-tert.-butyl-4-methyl-phenol, E321), lecithins, mono- and diglycerides of edible fatty acids esterified with citric acid, carotenoids, carotenes (for example a-carotene, β-carotene, lycopene) and derivatives thereof, phytic acid, lactoferrin, EDTA, EGTA), folic acid and derivatives thereof, ubiquinone and ubiquinol and derivatives thereof, ferulic acid and derivatives thereof, zinc and derivatives thereof (for example ZnO, ZnSO4), selenium and derivatives thereof (for example selenium methionine), orthophosphates and Na, Ka and Ca salts of monophosphoric acid as well as ingredients isolated from plants, extracts or fractions thereof, for example, from tea, green tea, algae, grape seeds, wheatgerm, camomile, rosemary and oregano.

Preferred cooling active ingredients are as follows: l-menthol, d-menthol, racemic menthol, menthone glycerol acetal (trade name: Frescolat® MGA), menthyl lactate (trade name: Frescolat® ML, menthyl lactate preferably being 1-menthyl lactate, in particular 1-menthyl-1-lactate), substituted menthyl-3-carboxamides (for example menthyl-3-carboxylic acid-N-ethylamide), 2-isopropyl-N-2,3-trimethylbutanamide, substituted cyclohexane carboxamides, 3-menthoxypropane-1,2-diol, 2-hydroxyethyl menthyl carbonate, 2-hydroxypropyl menthyl carbonate, N-acetylglycine menthyl ester, isopulegol, hydroxycarboxylic acid menthyl esters (for example menthyl-3-hydroxybutyrate), monomenthyl succinate, 2-mercaptocyclodecanone, menthyl-2-pyrrolidin-5-onecarboxylate, 2,3-dihydroxy-p-menthane, 3,3,5-trimethylcyclohexanone glycerol ketal, 3-menthyl-3,6-di- and -trioxaalkanoates, 3-menthyl methoxyacetate and icilin.

Cooling active ingredients which are particularly preferred are as follows: l-menthol, racemic menthol, menthone glycerol acetal (trade name: Frescolat® MGA), menthyl lactate (preferably l-menthyl lactate, in particular l-menthyl-l-lactate, trade name: Frescolat® ML), 3-menthoxypropane-1,2-diol, 2-hydroxyethyl menthyl carbonate, 2-hydroxypropyl menthyl carbonate.

Depending on the substance, the concentration of the cooling active ingredients to be used is preferably within a concentration range of from 0.01 to 20% by weight and preferably within a concentration range of from 0.1 to 5% by weight, based on the total mass of the finished (ready-for-use) products according to the invention, in particular foodstuff and enjoyment food products, beverages, semi-finished, oral hygiene, cosmetic or pharmaceutical products.

The products according to the invention can contain, for example, the following dyes, colorants or pigments: lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beetroot red, betanin, anthocyanins, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue 11, ultramarine, phthalocyanine blue, phthalocayanine green, fast acid violet R. Further naturally obtained extracts (for example paprika extract, black carrot extract, red cabbage extract) can be used for coloring purposes. Goods results are also achieved with the colors named in the following, the so-called aluminum lakes: FD & C Yellow 5 Lake, FD & C Blue 2 Lake, FD & C Blue 1 Lake, Tartrazine Lake, Quinoline Yellow Lake, FD & C Yellow 6 Lake, FD & C Red 40 Lake, Sunset Yellow Lake, Carmoisine Lake, Amaranth Lake, Ponceau 4R Lake, Erythrosyne Lake, Red 2G Lake, Allura Red Lake, Patent Blue V Lake, Indigo Carmine Lake, Brilliant Blue Lake, Brown HT Lake, Black PN Lake, Green S Lake and mixtures thereof.

Examples of suitable (mineral) fillers for working into the products according to the invention are calcium carbonate, titanium dioxide, silicon dioxide, talc, aluminum oxide, dicalcium phosphate, tricalcium phosphate, magnesium hydroxide and mixtures thereof.

The further conventional basic substances, auxiliaries and/or additives for products according to the invention, in particular foodstuff and enjoyment food products, beverages, semi-finishes, oral hygiene, cosmetic or pharmaceutical products can usually be contained in quantities of from 0.00001 to 99.9% by weight, preferably from 10 to 80% by weight, based on the total weight of the product preparation. Furthermore, the preparations can contain water or other solvents in a quantity of up to 99.9% by weight, preferably from 5 to 80% by weight, based on the total weight of the product preparation.

According to a further preferred embodiment, before the flavoring and/or aromatic substances to be used according to the invention are used in the production of the products according to the invention, they are initially worked into a matrix (carrier) suitable for foodstuff and enjoyment food products, beverages, semi-finished, oral hygiene, cosmetic or pharmaceutical products, for example in the form of emulsions, liposomes, e.g. starting from phosphatidyl choline, microspheres, nanospheres or also in capsules, granules or extrudates. More preferably, the matrix is selected in this respect such that the flavoring and/or aromatic substances are released in a delayed manner from the matrix, such that a long-lasting effect is achieved.

Preferred matrices into which the flavoring and/or aromatic substances are incorporated before they are used in the production of the preparations according to the invention, preferably comprise one or more materials selected from the following group: carbohydrate polymers (polysaccharides) (for example starch, starch derivatives, cellulose or cellulose derivatives (for example hydroxypropyl cellulose), alginates, gellan gum, agar or carrageen), natural fats, natural waxes (for example beeswax, carnauba wax), proteins, for example gelatin, complex formers (for example cyclodextrins or cyclodextrin derivatives, preferably beta-cyclodextrin).

Furthermore, it has proved advantageous to convert the flavoring and/or aromatic substances into a spray-dried from before they are used in the production of the preparations according to the invention. Individual substances or substance mixtures can be used as matrices for the flavoring and/or aromatic substances to be used according to the invention. Advantageous carriers are carbohydrates and/or carbohydrate polymers (polysaccharides). The following are mentioned as preferred carriers for the flavoring and/or aromatic substances in spray-dried form: hydrocolloids such as starches, decomposed starches, chemically or physically modified starches, modified celluloses, gum arabic, ghatti gum, traganth, caraya, carrageenan, guar gum, locust bean gum, alginates (for example Na-alginate), pectin, inulin or xanthan gum. Preferred carriers are maltodextrins and mixtures of maltodextrins and gum arabic, maltodextrins having DE values within a range of from 15 to 20 in each case again being advantageous. The decomposition degree of the starch is measured using the "dextrose equivalent" (DE) characteristic number, which can assume the limiting value 0 for the long-chain glucose polymer and 100 for the pure glucose. The encapsulation of flavoring and/or aromatic substances by means of spray-drying is known to a person skilled in the art and is described, for example in U.S. Pat. No. 3,159,585, U.S. Pat. No. 3,971,852, U.S. Pat. No. 4,532,145 or U.S. Pat. No. 5,124,162. Spray-dried flavorings are commercially available in many different flavors and particle sizes.

Furthermore, the details already provided in respect of the adsorption and/or desorption processes according to the invention, including the preferred embodiments, apply to the uses according to the invention of the inventive flavoring concentrates and to the alternative concentration processes according to the invention.

The following examples illustrate the invention, without thereby restricting it to these embodiments alone.

1. Adsorption Process According to the Invention Using the Example of an Aqueous Orange Flavoring Detected within the sensory profile of the aqueous orange flavor are 2E-hexenal (log Pow 1.61), linalool (log Pow 3.28), octanal (log Pow 3.03) and citral (log Pow 3.17) as flavoring and/or aromatic substances from group i) which convey a positive sensory impression. 1-butanol (log Pow 0.88), 2-methylbutanol (log Pow 1.29) and diacetyl (log Pow−1.33) are detected as flavoring and/or aromatic substances from group ii) which convey a negative sensory impression in the orange solution.

The concentrations of the flavoring and/or aromatic substances, presented above, in this orange flavoring are stated in [ppm] in Table 3 in the category "aqueous flavoring". Two liters of an orange solution of this type were adjusted with ethanol (96.9%) to an ethanol proportion of 2% by volume, such that the log Pow* values of the one or more flavoring and/or aromatic substances from group i) have a log Pow* value of at least 1.49.

A polystyrene crosslinked with divinyl benzene was used as adsorption medium. The column used was a cylindrical steel body sealed at each end by a screw cap. Provided in each screw cap was a respective tube discharge, through which the liquids could be pumped into or respectively out of the column. The volume of the column was 30 ml.

A rate of 0.5 cm/sec was adjusted as the flow rate during the adsorption procedure in step e) of the adsorption process according to the invention.

The temperature of the aqueous orange solution in step e) of the adsorption procedure according to the invention was within a range of from 21 to 23° C.

The counterpressure on the aqueous orange solution in step e) of the adsorption process according to the invention was within a range of from 0.5 to 0.9 bar.

Pure ethanol (96.5% by volume) was used as desorbent.

The concentrations of the above-mentioned flavoring and/or aromatic substances are stated in [ppm] in Table 3 in the "flavoring concentrate" column.

This table clearly shows that the concentration of linalool, 2E-hexenal, octanal, geranial and neral (mixture of geranial and neral is also called citral) as flavoring and/or aromatic substances from group i) are more highly concentrated by at least a factor of 1.7 compared to 2-methyl butanol, butyl alcohol and diacetyl as flavoring and/or aromatic substances from group ii).

2. Desorption Process According to the Invention Based on an Aqueous Apple Flavoring An aqueous apple flavoring was used, comprising the following flavoring and/or aromatic substances:
flavoring and/or aromatic substances which convey a positive sensory impression: 2E-hexenol, 2E-hexenal, butyl acetate, ethyl butyrate, ethylmethyl butyrate-2 and hexyl acetate; flavoring and/or aromatic substances which convey a negative sensory impression: butanol, 2-methylbutanol and 3-methylbutanol.

The proportion of solvent in the aqueous flavoring was significantly less than 1% by volume and was approximately 0.1% (detected using HPLC).

The adsorption material used was a polystyrene crosslinked with divinylbenzene in the column, already described under point 1., having a column volume of 30 ml.

Three liters of an aqueous apple flavoring were passed through the column containing adsorption material according to step c) of the desorption process according to the invention, the above-mentioned flavoring and/or aromatic substances being adsorbed on the adsorption material, such that during this procedure, it was already possible to observe a depletion of polar substances having a log Pow of less than 1.30, i.e. the polar substances remained in the aqueous flavoring.

For the subsequent desorption procedure according to step e) of the desorption process according to the invention, an ethanol (96.5% by volume) to water mixture of 1:1 was used.

The flow rate during the desorption procedure in step e) of the desorption process according to the invention was in the region of 3 cm/min.

The temperature of the solvent mixture during the desorption procedure in step e) of the desorption process according to the invention was 22° C.

The counterpressure in the apparatus, measured using a manometer, was 0.9 bar.

The time fractions during the desorption procedure were cut such that fractions each having a volume of 5 ml were obtained.

The concentrations of the individual flavoring and/or aromatic substances in the collected fractions 1 to 6 (fr. 1 to fr. 6) are stated in [ppm] in the following Table 4.

TABLE 4

| Name | Aqueous flavoring [ppm] | Fr. 1 [ppm] | Fr. 2 [ppm] | Fr. 3 [ppm] | Fr. 4 [ppm] | Fr. 5 [ppm] | Fr. 6 [ppm] |
|---|---|---|---|---|---|---|---|
| 2E-hexenol | 14.1 | 141.27 | 395.86 | 221.18 | 35.62 | 4.61 | 0.00 |
| 2-methylbutanol | 7.9 | 50.10 | 81.95 | 17.50 | 0.00 | 0.00 | 0.00 |
| 3-methylbutanol | 1.2 | 2.91 | 4.01 | 0.00 | 0.00 | 0.00 | 0.00 |
| Butanol | 6.7 | 24.62 | 13.51 | 2.54 | 0.00 | 0.00 | 0.00 |
| 3Z-hexenol | 2.1 | 6.61 | 58.46 | 42.73 | 0.00 | 0.00 | 0.00 |
| 2E-hexenal | 3.7 | 3.15 | 15.56 | 88.72 | 86.40 | 45.13 | 16.92 |
| Butylacetate | 25.1 | 2.83 | 184.02 | 669.13 | 802.12 | 488.64 | 205.03 |
| Ethylbutyrate | 6.1 | 0.00 | 23.57 | 136.74 | 152.35 | 76.00 | 30.00 |
| Ethylmethyl butyrate-2 | 0.8 | 0.00 | 3.30 | 14.04 | 17.92 | 12.29 | 6.10 |
| Hexylacetate | 1.3 | 0.00 | 3.46 | 19.84 | 38.14 | 40.08 | 32.41 |

Since 3000 ml of an aqueous flavoring were used and six fractions (fr. 1 to fr. 6) each having a volume of 5 ml were obtained, a concentration by a factor of 100 is achieved based on the concentrations, added up in all the fractions, of the respective flavoring and/or aromatic substances.

It can easily be seen that butanol as a compound of group ii) which conveys a negative sensory impression, should be concentrated to a total of 670 ppm, although the summation of fractions 1 to 3 only produces 40.5 ppm. This is associated with the fact that butanol was adsorbed very poorly on the adsorption material during the adsorption procedure of the described desorption process.

In respect of the compound ethylmethyl butyrate-2, this compound should have been approximately 80 ppm in the summation of all the fractions, as a compound from group i) which conveys a positive sensory impression. However, 54 ppm of ethylmethyl butyrate-2 are recovered analytically, implying errors of the measuring method. It is significant here, however, that ethylmethyl butyrate-2 is substantially recovered in fractions from fraction 3, that is, in fractions in which butanol, as a compound which conveys a negative sensory impression, is substantially no longer present.

SPECIFIC EMBODIMENTS

Specific embodiment one comprises a process for the preparation of a flavoring concentrate, wherein one or more flavoring and/or aromatic substances, which convey a positive sensory impression, independently of one another are more highly concentrated, in each case by a factor of 1.5 or more, compared to one or more flavoring and/or aromatic substances, which convey a negative sensory impression, based on an aqueous flavoring, comprising or consisting of the following steps:

a) preparation of an aqueous flavoring comprising
   i. one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones,
   ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid,
b) preparation of one, two or more solvents suitable for foodstuffs,
c) addition of the solvent(s) of step b) to the solution of step a), the resulting solvent proportion being adjusted such that the one or more flavoring and/or aromatic substances from group i) independently of one another have in each case a log Pow* value of greater than or equal to 1.20, and the log Pow* value is calculated as follows:

log Pow*=log Pow−x*P'(x)/log Pow where log Pow is the decimal logarithm of the distribution coefficient of the flavoring and/or aromatic between octanol to water,
   where x is the resulting solvent proportion based on the total volume proportion, normalized as 1.0, and
   where P'(x) is the polarity parameter for the corresponding solvent in the resulting solvent proportion x,
d) preparation of an adsorption material in a suitable apparatus,
e) passing the solution of step c) through an apparatus with adsorption material of step d) so that predominantly the one or more flavorings and/or aromatic substances which convey a positive sensory impression are adsorbed on the absorption material,
f) preparation of one, two or more solvents suitable for foodstuffs,
g) desorption of the flavoring and/or aromatic substances from the adsorption material of step e) with the solvent(s) of step f), such that in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more than in the aqueous flavoring of step a).

Specific embodiment two comprises the process as in specific embodiment one, wherein in step c), the solvent proportion is simultaneously adjusted such that the one or more flavoring and/or aromatic substances of group ii) independently of one another each have a log Pow* value of less than 1.20.

Specific embodiment three comprises the process as in either specific embodiment one or two, wherein in step c), the solvent proportion is simultaneously within a range of from 1% by volume to 6% by volume, based on the resulting solution.

Specific embodiment four comprises the process as in specific embodiments one to three, wherein the solvent or solvents of step b) are selected from the group consisting of methanol, ethanol, propanol and isopropanol.

Specific embodiment five comprises the process as in any one of specific embodiments one to four, wherein the solvent or solvents of step f) are selected from the group consisting of methanol, ethanol, propanol, isopropanol, ethyl acetate, diacetin, triacetin, liquid carbon dioxide, chlorofluorocarbons suitable for foodstuffs and plant triglycerides.

Specific embodiment six comprises the process as in any one of specific embodiments one to five, wherein the counterpressure on the solution of step c) is within a range of from 0.1 bar to 4.0 bar at least during part of the adsorption procedure in step e).

Specific embodiment seven comprises a process for the preparation of a flavoring concentrate, wherein one or more flavoring and/or aromatic substances which convey a positive sensory impression independently of one another are more highly concentrated, in each case by a factor of 1.5 or more, compared to one or more flavoring and/or aromatic substances which convey a negative sensory impression, based on an aqueous flavoring, comprising or consisting of the following steps:

a) preparation of an aqueous flavoring comprising
   i) one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z, 7Z-tridecatrienal, 2E,5Z-undecadienal, nonanal, 4-ocanolide, 5-octanolide, phenylethanol, wine lactone and menthofurolactones,
   ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid, the proportion of solvent, based on the total volume of the aqueous solution, being present within a range of from 0% by volume to less than 1% by volume, b) preparation of an adsorption material in a suitable apparatus, c) passing the solution of step a) through the apparatus with adsorption material of step b) so that the one or more flavoring and/or aromatic substances from group i) and also the one or more flavoring and/or aromatic substances from group ii) are adsorbed on the absorption material, d) preparation of one or more solvents or solvent mixtures with water, the solvents or solvent mixtures being selected such that one or more flavoring and/or aromatic substances of group ii) have a log Pow* value of 1.20 or less, and e) desorption of the flavoring and/or aromatic substances from the adsorption material of step c) with the solvents or the solvent mixtures of step d), one, two, three, four, five, six, seven or more fractions being collected over time and one of these fractions or a mixture of two, three, four, five, six, seven or more of these fractions forming the flavoring concentrate, and in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more than in the aqueous flavoring of step a), the solvent or solvents used for desorption being selected such that the flavoring and/or aromatic substances to be desorbed have a log Pow* value of 1.20 or less and the log Pow* value is calculated as follows:

$$\log Pow^* = \log Pow - x^* P'(x)/\log Pow$$

where log Pow is the decimal logarithm of the distribution coefficient of the flavoring and/or aromatic between octanol to water, where x is the resulting solvent proportion based on the total volume proportion, normalized as 1.0, and where P'(x) is the polarity parameter for the corresponding solvent in the resulting solvent proportion x.

Specific embodiment eight comprises the process as in specific embodiment seven, the counterpressure on the solution of step d) is within a range of from 0.1 bar to 4.0 bar at least during part of the adsorption procedure in step e).

Specific embodiment nine comprises the process as in any one of the above specific embodiments, wherein the adsorption material is selected from the group consisting of crosslinked polystyrenes, preferably ethylvinylbenzene and divinylbenzene, vinylpyrrolidone and divinylbenzene, vinylpyridine and divinylbenzene, styrene and divinylbenzene, and other polymers, preferably polyaromatic substances, polystyrenes, polymethacrylates, polypropylenes, polyesters and polytetrafluoroethylene.

Specific embodiment ten comprises a flavoring concentrate which can be prepared by a process as in any one of specific embodiments one to nine, wherein the resulting flavoring concentrate comprises the one or more flavoring and/or aromatic substances from group i) compared to the one or more flavoring and/or aromatic substances from group ii) in a higher concentration in each case by a factor of 1.5 or more, independently of one another, than the aqueous flavoring.

Specific embodiment eleven comprises a foodstuff, enjoyment food, beverage, semi-finished, oral hygiene, cosmetic or pharmaceutical products comprising one or more flavoring concentrates as in specific embodiment ten as well as one or more basic substances, auxiliaries and/or additives.

Specific embodiment twelve comprises a use of flavoring concentrates as in specific embodiment ten in foodstuff, enjoyment food, beverage, semi-finished, oral hygiene, cosmetic or pharmaceutical products.

Specific embodiment thirteen comprises a use of flavoring concentrates as in specific embodiment ten for the production of foodstuff, enjoyment food, beverage, semi-finished, oral hygiene, cosmetic or pharmaceutical products.

Specific embodiment fourteen comprises a process for the concentration of one or more flavoring and/or aromatic substances which convey a positive sensory impression in a resulting flavoring concentrate independently of one another in each case by a factor of 1.5 or more, compared to one or more flavoring and/or aromatic substances which convey a negative sensory impression, based on an aqueous flavoring, comprising or consisting of the following steps:

a) preparation of an aqueous flavoring comprising
   i. one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones,
   ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid,
b) preparation of one, two or more solvents suitable for foodstuffs,
c) addition of the solvent(s) of step b) to the solution of step a), the resulting solvent proportion being adjusted such that the one or more flavoring and/or aromatic substances from group i) independently of one another have in each case a log Pow* value of greater than or equal to 1.20, and the log Pow* value is calculated as follows:

$$\log Pow^* = \log Pow - x^* P'(x)/\log Pow$$

where log Pow is the decimal logarithm of the distribution coefficient of the flavoring and/or aromatic between octanol to water,
where x is the resulting solvent proportion based on the total volume proportion, normalized as 1.0, and
where P'(x) is the polarity parameter for the corresponding solvent in the resulting solvent proportion x,
d) preparation of an adsorption material in a suitable apparatus,
e) passing the solution of step c) through an apparatus with adsorption material of step d) so that predominantly the one or more flavorings and/or aromatic substances which convey a positive sensory impression are adsorbed on the absorption material,
f) preparation of one, two or more solvents suitable for foodstuffs, and
g) desorption of the flavoring and/or aromatic substances from the adsorption material of step e) with the solvent(s) of step f), such that in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more than in the aqueous flavoring of step a).

Specific embodiment fifteen comprises a process for the concentration of one or more flavoring and/or aromatic substances, which convey a positive sensory impression, in a resulting flavoring concentrate independently of one another in each case by a factor of 1.5 or more, compared to one or more flavoring and/or aromatic substances which convey a negative sensory impression, based on an aqueous flavoring, comprising or consisting of the following steps:

a) preparation of an aqueous flavoring comprising
   i) one or more flavoring and/or aromatic substances which convey a positive sensory impression, selected from the list consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropylsulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones,
   ii. one or more flavoring and/or aromatic substances which convey a negative sensory impression, selected from the list consisting of $C_1$-$C_5$-alcohols, preferably methanol, ethanol, propanol, isopropanol, butanol, 2-methylbutanol, 3-methylbutanol, diacetyl, acetaldehyde, furfural, furfurylalcohol, phenol, acetoin, dimethylsulfide, methylmercaptan, lactic acid and acetic acid,
   the proportion of solvent, based on the total volume of the aqueous solution, being within a range of from 0% by volume to less than 1% by volume,
b) preparation of an adsorption material in a suitable apparatus,
c) passing the solution of step a) through the apparatus with adsorption material of step b) so that the one or more flavoring and/or aromatic substances from group i) and also the one or more flavoring and/or aromatic substances from group ii) are adsorbed on the absorption material,
d) preparation of one or more solvents or solvent mixtures with water, the solvents or solvent mixtures being selected such that one or more flavoring and/or aromatic substances of group ii) have a log Pow* value of 1.20 or less, and
e) desorption of the flavoring and/or aromatic substances from the adsorption material from step c) with the solvents or the solvent mixtures from step d), one, two, three, four, five, six, seven or more fractions being collected over time and one of these fractions or a mixture of two, three, four, five, six, seven or more of these fractions forming the flavoring concentrate, and in the resulting flavoring concentrate the one or more flavoring and/or aromatic substances from group i) compared to the one or more flavoring and/or aromatic substances from group ii) are present in a higher concentration, independently of one another, in each case by a factor of 1.5 or more than in the aqueous flavoring from step a), the solvent or solvents used for desorption being selected such that the flavoring and/or aromatic substances to be desorbed have a log Pow* value of 1.20 or less and the log Pow* value is calculated as follows:

$$\log \text{Pow*} = \log \text{Pow} - x * P'(x)/\log \text{Pow}$$

where log Pow is the decimal logarithm of the distribution coefficient of the flavoring and/or aromatic between octanol to water,
where x is the resulting solvent proportion based on the total volume proportion, normalized as 1.0, and
where P'(x) is the polarity parameter for the corresponding solvent in the resulting solvent proportion x.

We claim:

1. A process for preparing a flavoring concentrate comprising one or more flavoring and/or aromatic substances which convey a positive sensory impression and one or more flavoring and/or aromatic substances which convey a negative sensory impression, wherein each of the one or more flavoring and/or aromatic substances which convey a positive sensory impression are more concentrated by a factor of 1.5 or more, as compared to the one or more flavoring and/or aromatic substances which convey a negative sensory impression, based on an aqueous flavoring, comprising:
   a) preparing an aqueous flavoring comprising:
      i. one or more flavoring and/or aromatic substances which convey a positive sensory impression, selected from the group consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones,
      ii. one or more flavoring and/or aromatic substances which convey a negative sensory impression, selected from the group consisting of $C_1$-$C_5$-alcohols, diacetyl, acetaldehyde, furfural, furfurylalcohol, phenol, acetoin, dimethylsulfide, methylmercaptan, lactic acid and acetic acid,
   b) preparing at least one solvent, wherein the solvent is suitable for foodstuffs,
   c) adding the solvent of step b) to the solution of step a), and adjusting the resulting solvent proportion so that each of the one or more flavoring and/or aromatic substances from group i) have in each case a log Pow* value of greater than or equal to 1.20, wherein the log Pow* value is calculated as follows:

$$\log \text{Pow*} = \log \text{Pow} - x * P'(x)/\log \text{Pow}$$

where log Pow is the decimal logarithm of the distribution coefficient of the flavoring and/or aromatic between octanol to water,
where x is the resulting solvent proportion based on the total volume proportion, normalized as 1.0, and
where P'(x) is the polarity parameter for the corresponding solvent in the resulting solvent proportion x,
   d) preparing an adsorption material in a suitable apparatus,
   e) passing the solution of step c) through an apparatus with adsorption material of step d) so that the one or more flavorings and/or aromatic substances which convey a positive sensory impression are adsorbed on the absorption material,
   f) preparing at least one solvent suitable for foodstuffs,
   g) desorbing the flavoring and/or aromatic substances from the adsorption material of step e) with the solvent of step f), such that each of the one or more flavoring and/or aromatic substances from group i) are present in a higher concentration as compared to the one or more flavoring and/or aromatic substances from group ii), in each case by a factor of 1.5 or more than in the aqueous flavoring of step a).

2. The process as claimed in claim 1, wherein in step c), the solvent proportion is simultaneously adjusted such that each of the one or more flavoring and/or aromatic substances of group ii) has a log Pow* value of less than 1.20.

3. The process as claimed in claim 1, wherein in step c), the solvent proportion is simultaneously adjusted within a range of from 1% by volume to 6% by volume, based on the resulting solution.

4. The process as claimed in claim 1, wherein the solvent of step b) is selected from the group consisting of methanol, ethanol, propanol and isopropanol.

5. The process as claimed in claim 1, wherein the solvent of step f) is selected from the group consisting of methanol, ethanol, propanol, isopropanol, ethyl acetate, diacetin, triacetin, liquid carbon dioxide, chlorofluorocarbons suitable for foodstuffs and plant triglycerides.

6. The process as claimed in claim 1, wherein the counter-pressure on the solution of step c) is within a range of from 0.1 bar to 4.0 bar during at least part of the adsorption procedure in step e).

7. A process for preparing a flavoring concentrate comprising one or more flavoring and/or aromatic substances which convey a positive sensory impression and one or more flavoring and/or aromatic substances which convey a negative sensory impression, wherein each of the one or more flavoring and/or aromatic substances which convey a positive sensory impression are more concentrated, by a factor of 1.5 or more, as compared to the one or more flavoring and/or aromatic substances which convey a negative sensory impression, based on an aqueous flavoring, comprising:
   a) preparing an aqueous flavoring comprising:
      i) one or more flavoring and/or aromatic substances which convey a positive sensory impression, selected from the group consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones, ii. one or more flavoring and/or aromatic substances which convey a negative sensory impression, selected from the group consisting of $C_1$-$C_5$-alcohols, diacetyl, acetaldehyde, furfural, furfurylalcohol, phenol, acetoin, dimethylsulfide, methylmercaptan, lactic acid and acetic acid, wherein the proportion of solvent is present within a range of from 0% by volume to less than 1% by volume, based on the total volume of the aqueous solution b) preparing an adsorption material in a suitable apparatus, c) passing the solution of step a) through the apparatus with adsorption material of step b) so that the one or more flavoring and/or aromatic substances from group i) and the one or more flavoring and/or aromatic substances from group ii) are adsorbed on the absorption material, d) mixing one or more solvents or solvent mixtures with water, wherein the solvents or solvent mixtures are selected such that the one or more flavoring and/or aromatic substances of group ii) have a log Pow* value of 1.20 or less, and e) desorbing the flavoring and/or aromatic substances from the adsorption material of step c) with the solvents or the solvent mixtures of step d), and collecting at least one to form a flavoring concentrate, wherein the flavoring concentrate comprises a concentration of the one or more flavoring and/or aromatic substances from group i) that is higher than the one or more flavoring and/or aromatic substances from group ii) by a factor of 1.5 or more than in the aqueous flavoring of step a), and wherein the solvents or solvent mixtures used for desorption are selected such that the flavoring and/or aromatic substances to be desorbed have a log Pow* value of 1.20 or less, wherein the log Pow* value is calculated as follows:

$$\log \text{Pow*} = \log \text{Pow} - x \cdot P'(x)/\log \text{Pow}$$

where log Pow is the decimal logarithm of the distribution coefficient of the flavoring and/or aromatic between octanol to water, where x is the resulting solvent proportion based on the total volume proportion, normalized as 1.0, and where P'(x) is the polarity parameter for the corresponding solvent in the resulting solvent proportion x.

8. The process as claimed in claim 7, wherein the counter-pressure on the solution of step d) is within a range of from 0.1 bar to 4.0 bar during at least part of the adsorption procedure in step e).

9. The process as claimed in claim 1, wherein the adsorption material is a crosslinked polystyrene or other polymers.

10. A process of concentrating one or more flavoring and/or aromatic substances which convey a positive sensory impression to form a flavoring concentrate:

a) preparing an aqueous flavoring comprising:
i. one or more flavoring and/or aromatic substances which convey a positive sensory impression, selected from the group consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropyldisulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones, ii. one or more flavoring and/or aromatic substances which convey a negative sensory impression, selected from the group consisting of $C_1$-$C_5$-alcohols, diacetyl, acetaldehyde, furfural, furfurylalcohol, phenol, acetoin, dimethylsulfide, methylmercaptan, lactic acid and acetic acid, b) preparing at least one solvent, wherein the solvent is suitable for foodstuffs, c) adding the solvent of step b) to the solution of step a), and adjusting the resulting solvent proportion such that each of the one or more flavoring and/or aromatic substances from group i) have a log Pow* value of greater than or equal to 1.20, wherein the log Pow* value is calculated as follows:

$$\log \text{Pow*} = \log \text{Pow} - x \cdot P'(x)/\log \text{Pow}$$

where log Pow is the decimal logarithm of the distribution coefficient of the flavoring and/or aromatic between octanol to water, where x is the resulting solvent proportion based on the total volume proportion, normalized as 1.0, and where P'(x) is the polarity parameter for the corresponding solvent in the resulting solvent proportion x, d) preparing an adsorption material in a suitable apparatus, e) passing the solution of step c) through an apparatus with adsorption material of step d) so that the one or more flavorings and/or aromatic substances which convey a positive sensory impression are adsorbed on the absorption material, f) preparing at least one solvent suitable for foodstuffs, and g) desorbing the flavoring and/or aromatic substances from the adsorption material of step e) with the solvent of step f), such that the resulting flavoring concentrate comprises a concentration of the one or more flavoring and/or aromatic substances from group i) that is more concentrated by a factor of 1.5 or more as compared to the one or more flavoring and/or aromatic substances from group ii) than in the aqueous flavoring of step a).

11. A process for concentrating one or more flavoring and/or aromatic substances which convey a positive sensory impression to form a flavoring concentrate:

a) preparing an aqueous flavoring comprising:
i) one or more flavoring and/or aromatic substances which convey a positive sensory impression, selected from the group consisting of ethylbutyrate, ethylmethylbutyrate-2, methylcapronate, linalool, alpha-ionone, beta-ionone, delta-decalactone, 2E-hexenol, 2E-hexenal, hexanal, beta-damascenone, octanal, nootkatone, p-menthenethiol-1,8, benzaldehyde, gamma-decalactone, linalooloxide, furfurylthiol-2,4-vinylguaiacol, isomeric isopropylmethoxy pyrazine, isomeric ethyldimethylpyrazine, indole, methyl jasmonate, jasmine lactone, dipropylsulfide, dipropyltrisulfide, methylpropyldisulfide, L-menthol, menthone, L-carvone, isoamylacetate, 2-acetyl-1-pyrroline, 2E,4Z-decadienal, 3,5-dimethyltrithiolane, citrale, caryophyllene, 1-octen-3-ol, 1-octen-3-one, hydroxybenzylacetone, cis-3-hexenol, 3Z-hexenol, methylbutyrate, geraniol, ethyl-2E,4Z-decadienoate, 8-mercapto-p-menth-1-en-3-one, 2E,4Z,7Z-tridecatrienal, 2E,5Z-undecadienal, nonanal, 4-ocanolide, 5-octanolide, phenylethanol, wine lactone and menthofurolactones, ii. one or more flavoring and/or aromatic substances which convey a negative sensory impression, selected from the group consisting of $C_1$-$C_5$-alcohols, diacetyl, acetaldehyde, furfural, furfurylalcohol, phenol, acetoin, dimethylsulfide, methylmercaptan, lactic acid and acetic acid, the proportion of solvent, based on the total volume of the aqueous solution, being within a range of from 0% by volume to less than 1% by volume, b) preparing an adsorption material in a suitable apparatus, c) passing the solution of step a) through the apparatus with adsorption material of step b) so that the one or more flavoring and/or aromatic substances from group i) and the one or more flavoring and/or aromatic substances from group ii) are adsorbed on the absorption material, d) mixing one or more solvents or solvent mixtures with water, wherein the solvents or solvent mixtures are selected such that the one or more flavoring and/or aromatic substances of group ii) have a log Pow* value of 1.20 or less, and e) desorbing the flavoring and/or aromatic substances from the adsorption material from step c) with the solvents or the solvent mixtures from step d), and collecting at least one fraction to form a flavoring concentrate comprising a concentration of one or more flavoring and/or aromatic substances from group i) that is higher than the one or more flavoring and/or aromatic substances from group ii) by a factor of 1.5 or more than in the aqueous flavoring from step a), wherein the solvent or solvents used for desorption are selected such that the flavoring and/or aromatic substances to be desorbed have a log Pow* value of 1.20 or less and the log Pow* value is calculated as follows:

$$\log \text{Pow*} = \log \text{Pow} - x \cdot P'(x)/\log \text{Pow}$$

where log Pow is the decimal logarithm of the distribution coefficient of the flavoring and/or aromatic between octanol to water, where x is the resulting solvent proportion based on the total volume proportion, normalized as 1.0, and where $P'(x)$ is the polarity parameter for the corresponding solvent in the resulting solvent proportion x.

12. The process of claim 1, wherein the $C_1$-$C_5$-alcohol is selected from the group consisting of methanol, ethanol, propanol, isopropanol, butanol, 2-methylbutanol, and 3-methylbutanol.

13. The process of claim 7, wherein the $C_1$-$C_5$-alcohol is selected from the group consisting of methanol, ethanol, propanol, isopropanol, butanol, 2-methylbutanol, and 3-methylbutanol.

14. The process of claim 10, wherein the $C_1$-$C_5$-alcohol is selected from the group consisting of methanol, ethanol, propanol, isopropanol, butanol, 2-methylbutanol, and 3-methylbutanol.

15. The process of claim 10, wherein the $C_1$-$C_5$-alcohol is selected from the group consisting of methanol, ethanol, propanol, isopropanol, butanol, 2-methylbutanol, and 3-methylbutanol.

16. The process of claim 9, wherein the crosslinked polystyrenes are selected from the group consisting of ethylvinylbenzene and divinylbenzene, vinylpyrrolidone and divinylbenzene, vinylpyridine and divinylbenzene, and styrene and divinylbenzene.

17. The process of claim 9, wherein the other polymers are selected from the group consisting of polyaromatic substances, polystyrenes, polymethacrylates, polypropylenes, polyesters and polytetrafluoroethylene.

* * * * *

UNITED STATES PATENT AND TRADEMARK OFFICE
CERTIFICATE OF CORRECTION

PATENT NO. : 8,158,180 B2  Page 1 of 1
APPLICATION NO. : 12/335859
DATED : April 17, 2012
INVENTOR(S) : Ingo Reiss et al.

It is certified that error appears in the above-identified patent and that said Letters Patent is hereby corrected as shown below:

On the front page:

Assignee should be changed as follows:

~~SYMRISE GMBH & CO. KG~~ <u>SYMRISE AG</u>

Signed and Sealed this
Twenty-eighth Day of August, 2012

David J. Kappos
*Director of the United States Patent and Trademark Office*